US012811062B2

(12) United States Patent
Guo et al.

(10) Patent No.: US 12,811,062 B2
(45) **Date of Patent: *Nov. 24, 2026**

(54) METALLIC POWDERS FOR USE AS ELECTRODE MATERIAL IN MULTILAYER CERAMIC CAPACITORS AND METHOD OF MANUFACTURING AND OF USING SAME

(71) Applicant: Tekna Plasma Systems Inc., Sherbrooke (CA)

(72) Inventors: Jiayin Guo, Sherbrooke (CA); Eric Bouchard, Montreal (CA); Richard Dolbec, Varennes (CA)

(73) Assignee: Tekna Plasma Systems Inc., Sherbrooke (CA)

( * ) Notice: Subject to any disclaimer, the term of this patent is extended or adjusted under 35 U.S.C. 154(b) by 182 days.

This patent is subject to a terminal disclaimer.

(21) Appl. No.: 18/797,991

(22) Filed: Aug. 8, 2024

(65) Prior Publication Data

US 2025/0115980 A1 Apr. 10, 2025

Related U.S. Application Data

(63) Continuation of application No. 17/461,174, filed on Aug. 30, 2021, now Pat. No. 12,098,444, which is a (Continued)

(51) Int. Cl.
*B22F 1/054* (2022.01)
*B22F 1/052* (2022.01)
(Continued)

(52) U.S. Cl.
CPC ............... *H01G 4/12* (2013.01); *B22F 1/052* (2022.01); *B22F 1/054* (2022.01); *B22F 1/056* (2022.01);
(Continued)

(58) Field of Classification Search
CPC . H01B 1/00; H01B 1/026; B22F 1/054; B22F 1/056; B22F 1/065; B22F 1/145
See application file for complete search history.

(56) References Cited

U.S. PATENT DOCUMENTS 4,971,738 A 11/1990 Heron et al.
7,666,247 B2 * 2/2010 He ........................ H01G 9/0525 419/30

(Continued)

FOREIGN PATENT DOCUMENTS

CA 3045573 A1 7/2019
CA 3065687 C 3/2021

(Continued)

OTHER PUBLICATIONS

Grugeon et al "Particle Size Effects on the Electrochemical Performance of Copper Oxides toward Lithium", Journal of The Electrochemical Society, 148 (4) A285-A292 (2001).*

(Continued)

*Primary Examiner* — Mark Kopec
(74) *Attorney, Agent, or Firm* — Fish & Richardson P.C.

(57) ABSTRACT

The present disclosure generally relates to metallic powders for use in multilayer ceramic capacitors, to multilayer ceramic capacitors containing same and to methods of manufacturing such powders and capacitors. The disclosure addresses the problem of having better controlled smaller particle size distribution, with minimal contaminant contents which can be implemented at an industrial scale.

19 Claims, 13 Drawing Sheets

Related U.S. Application Data continuation of application No. 16/472,799, filed as application No. PCT/CA2019/050115 on Jan. 30, 2019, now Pat. No. 11,127,530.

(60) Provisional application No. 62/623,708, filed on Jan. 30, 2018.

(51) Int. Cl.

| | |
|---|---|
| ***B22F 1/065*** | (2022.01) |
| ***B22F 9/12*** | (2006.01) |
| ***H01B 1/02*** | (2006.01) |
| ***H01G 4/008*** | (2006.01) |
| ***H01G 4/12*** | (2006.01) |
| *H01G 4/012* | (2006.01) |
| *H01G 4/30* | (2006.01) |

(52) U.S. Cl.

CPC ................ *B22F 1/065* (2022.01); *B22F 9/12* (2013.01); *H01B 1/026* (2013.01); *H01G 4/008* (2013.01); *B22F 2304/05* (2013.01); *H01G 4/012* (2013.01); *H01G 4/30* (2013.01)

(56) References Cited

U.S. PATENT DOCUMENTS

| | | | |
|---|---|---|---|
| 11,127,530 | B2 | 9/2021 | Guo et al. |
| 12,098,444 | B2 | 9/2024 | Guo et al. |
| 2004/0009350 | A1 | 1/2004 | Krause et al. |
| 2004/0248724 | A1 | 12/2004 | Venigalla et al. |
| 2006/0204754 | A1 | 9/2006 | Kang |
| 2007/0125195 | A1 | 6/2007 | Akimoto et al. |
| 2007/0128439 | A1 | 6/2007 | Kim et al. |
| 2007/0166455 | A1 | 7/2007 | Shen et al. |
| 2007/0237669 | A1 | 10/2007 | Lee et al. |
| 2008/0062614 | A1 | 3/2008 | Goia |
| 2008/0152938 | A1 | 6/2008 | Kelman et al. |
| 2008/0226487 | A1 | 9/2008 | Akimoto et al. |
| 2010/0031775 | A1 | 2/2010 | Seo et al. |
| 2010/0056366 | A1 | 3/2010 | Lee |
| 2011/0250132 | A1 | 10/2011 | Seetharama |
| 2012/0156494 | A1 * | 6/2012 | Wolfrum ................ C09C 1/043 977/892 |
| 2012/0262836 | A1 | 10/2012 | Chai |
| 2014/0332076 | A1 | 11/2014 | Liu et al. |
| 2015/0027765 | A1 | 1/2015 | Kim et al. |
| 2016/0271700 | A1 | 9/2016 | Akimoto |
| 2017/0252801 | A1 | 9/2017 | Ida et al. |
| 2018/0117673 | A1 | 5/2018 | Watanabe et al. |
| 2019/0180934 | A1 | 6/2019 | Popovici |
| 2020/0335279 | A1 | 10/2020 | Guo et al. |
| 2022/0051849 | A1 | 2/2022 | Guo et al. |
| 2024/0034896 | A1 | 2/2024 | Yoshia |

FOREIGN PATENT DOCUMENTS

| | | | | |
|---|---|---|---|---|
| CN | 1678416 | A | 10/2005 | |
| CN | 1813323 | A | 8/2006 | |
| CN | 1979694 | A | 6/2007 | |
| CN | 101104206 | A | 1/2008 | |
| CN | 101356116 | A | 1/2009 | |
| CN | 102123805 | A | 7/2011 | |
| CN | 1813323 | B | 9/2011 | |
| CN | 102467988 | A | 5/2012 | |
| CN | 102976326 | A | 3/2013 | |
| CN | 103311511 | A | 9/2013 | |
| CN | 103971930 | A | 8/2014 | |
| CN | 104517727 | A | 4/2015 | |
| CN | 103311511 | B | 5/2015 | |
| CN | 104843665 | A | 8/2015 | |
| CN | 111788650 | A | 10/2020 | |
| CN | 115188590 | A | 10/2022 | |
| CN | 115206678 | A | 10/2022 | |
| CN | 111788650 | B | 4/2023 | |
| EP | 1749600 | A1 * | 2/2007 | ................ B22F 1/16 |
| EP | 2946854 | A | 11/2015 | |
| HK | 40030375 | | 2/2021 | |
| JP | H052-66991 | A | 10/1993 | |
| JP | H06-279812 | A | 10/1994 | |
| JP | 2004-262672 | A | 9/2004 | |
| JP | 2004-342744 | A | 12/2004 | |
| JP | 2005-505695 | B2 | 2/2005 | |
| JP | 2008-277066 | A | 11/2008 | |
| JP | 2009-024239 | A | 2/2009 | |
| JP | 2011-195888 | A | 10/2011 | |
| JP | 2011-214144 | A | 10/2011 | |
| JP | 2013-224458 | A | 10/2013 | |
| JP | 2014-029013 | A | 2/2014 | |
| JP | 2017-025400 | A | 2/2017 | |
| JP | 2017-210641 | A | 11/2017 | |
| JP | 2021-512491 | A | 5/2021 | |
| JP | 7473475 | B2 | 4/2024 | |
| KR | 1020070101091 | A | 10/2007 | |
| KR | 2020-0111751 | A | 9/2020 | |
| KR | 10-2754030 | B1 | 1/2025 | |
| WO | WO 2017/056741 | A1 | 4/2017 | |
| WO | WO 2019/148277 | A1 | 8/2019 | |

OTHER PUBLICATIONS

Janardhanan et al "Synthesis and surface chemistry of nano silver particles" Polyhedron 28 (2009) 2522-2530.*

Lisiecki et al "Control of the Shape and the Size of Copper Metallic Particles", J. Phys. Chem. 1996, 100, 4160-4166.*

CA Notice of Allowance in Canadian Appln. No. 3,045,573, dated Dec. 16, 2019, 1 page.

CA Notice of Allowance in Canadian Appln. No. 3,065,687, dated Nov. 27, 2020, 1 page.

CA Office Action in Canadian Appln. No. 3,065,687, dated Jul. 17, 2020, 3 pages.

CA Search report in Canadian Appln. No. 3,045,573, dated Aug. 6, 2019, 4 pages.

CA Search report in Canadian Appln. No. 3,045,573, dated Nov. 8, 2019, 3 pages.

CA Search report in Canadian Appln. No. 3,065,687, dated Mar. 3, 2020, 4 pages.

CN Office Action in Chinese Appln. No. 111788650, dated Oct. 16, 2020, 91 pages (with English translation).

CN Office Action in Chinese Appln. No. 201980016029, dated Jun. 3, 2021, 32 pages (with English translation).

CN Office Action in Chinese Appln. No. 201980016029X, dated Mar. 24, 2022, 15 pages (with English translation).

CN Office Action in Chinese Appln. No. 201980016029X, dated Oct. 21, 2022, 8 pages (with English translation).

CN Office Action in Chinese Appln. No. 202210916286.2, dated Mar. 1, 2023, 14 pages (with English translation).

CN Office Action in Chinese Appln. No. 202210921751.1, dated Jul. 13, 2023, 16 pages (with English translation).

CN Office Action issued in connection with CN Patent Application No. 202210916286.2 on Sep. 24, 2023, 5 pages (+ EN machine translation).

Decision of rejection issued in connection with JP Patent Application No. 2020-541565 on Oct. 16, 2023, 4 pages (+ EN machine translation).

Digikey TechForum, "Introduction to Multilayer Ceramic Capacitors and Practical Application Hints", posted on Web Aug. 24, 2015 by Maker.io Staff.

Dulina et al, Obtaining of Ni/NiO nanopowder from aquasolutions of Ni(CH3COO)2 ammonia complexes, Nanoscale Research Letters (2015) vol. 10, Article 156, p. 1-17.

Dulina et al., "Obtaining of Ni/NiO nanopowder from aqua solutions of Ni (CH 3 COO) 2 ammonia complexes," Nanoscale Research Letters, Dec. 2015, 10, 17 pages.

Final rejection issued in connection with KR Patent Application No. 10-2020-7024227 on Sep. 13, 2023, 3 pages (+ EN translation).

JP Office Action in Japanese Appln. No. 2020-541565, dated Jun. 19, 2023, 48 pages (with English translation).

(56) References Cited

OTHER PUBLICATIONS

JP Office Action in Japanese Appln. No. 2020-541565, dated Jan. 30, 2023, 6 pages (with English translation).
KR Office Action in Korean Appln. No. 10-2020-0111751, dated Sep. 29, 2020, 104 pages (with English translation).
KR Office Action in Korean Appln. No. 10-2020-7024227, dated Mar. 20, 2023, 10 pages (with English translation).
PCT International Preliminary Report on Patentability in International Appln. No. PCT/CA2019/050115, mailed on Apr. 18, 2019, 4 pages.
PCT International Search Report and Written Opinion in International Appln. No. PCT/CA2019/050115, dated Apr. 18, 2019, 7 pages.
US Office Action in U.S. Appl. No. 16/472,799, dated Nov. 30, 2020, 7 pages.
CN Office Action issued Mar. 1, 2023, 7 pages, in connection with CN 202210916286.2.
CN Office Action issued May 27, 2024 in connection with Chinese Patent Application No. 202210921751.1, 6 pages.
International Preliminary Report on Patentability, Chapter 1, issued Aug. 4, 2020, in connection with PCT/CA2019/050115, 4 pages.
Notice of Allowance and Fee(s) due issued May 16, 2024 in connection with U.S. Appl. No. 17/461,174, 9 pages.
Notice of Allowance issued in connection with KR Patent Application No. 10-2024-7011908 on Oct. 7, 2024, 2 pages.
Office Action issued in connection with CN Patent Application No. 202210916286.2 on Oct. 29, 2024, 6 pages.
Office Action issued in connection with CN Patent Application No. 2022109217511 on Oct. 11, 2024, 8 pages.
Office Action issued in connection with JP Patent Application No. 2024-21115 on Sep. 30, 2024, 20 pages.
Office Action issued in connection with U.S. Appl. No. 17/461,174 on May 1, 2023, 9 pages.
Office Action issued in connection with U.S. Appl. No. 17/461,174 on Nov. 4, 2022, 11 pages.
Office Action issued in connection with U.S. Appl. No. 17/461,174 on Sep. 26, 2023, 12 pages.
Office Action issued in connection with U.S. Appl. No. 17/461,174 on Mar. 26, 2024, 10 pages.
Office Action issued on Jul. 29, 2024 in connection with KR Patent Application No. 10-2024-7011908, 3 pages.
jfe-steel.co.jp, "Improved Nickel Powder for Small Case Size MLCC with High Capacitance," JFE Technical Report, Oct. 2005, 6, 6 pages.
Kim et al., "Size and morphology manipulation of nickel nanoparticle in inductively coupled thermal plasma synthesis," Journal of Alloys and Compounds, Feb. 2016, 658:824-31.
Office Action issued in connection with JP Patent Application No. 2024-21115 on Mar. 18, 2025, 47 pages.
Office Action issued in connection with JP Patent Application No. 2024-21115 on Oct. 21, 2025, 4 pages.

* cited by examiner

METALLIC POWDERS FOR USE AS ELECTRODE MATERIAL IN MULTILAYER CERAMIC CAPACITORS AND METHOD OF MANUFACTURING AND OF USING SAME

CROSS-REFERENCE TO RELATED APPLICATION

The present application is a continuation application of and claims the benefit of priority under 35 U.S.C. § 120 to U.S. application Ser. No. 17/461,174, filed on Aug. 30, 2021, now U.S. Pat. No. 12,098,444, which is a continuation application of and claims priority to U.S. patent application Ser. No. 16/472,799, filed on Jun. 21, 2019, now U.S. Pat. No. 11,127,530, which is the national stage entry of International Patent Application No. PCT/CA2019/050115, filed on Jan. 30, 2019, which claims the benefit of U.S. provisional patent application Ser. No. 62/623,708 filed on Jan. 30, 2018. The contents of each application is incorporated herein by reference in their entirety for all purposes.

FIELD OF TECHNOLOGY

The present disclosure generally relates to metallic powders for use as electrode material in multilayer ceramic capacitors, to multilayer ceramic capacitors containing same and to methods of manufacturing such powders and capacitors.

BACKGROUND INFORMATION

Recently, in mobile electronic equipment such as cellular phones and personal computers, trends toward miniaturization, higher performance, and lower electric power consumption have become increasingly prominent. Integration and miniaturization into chips of passive components such as capacitors, inductors, and resistors used in these pieces of equipment have also been accelerated. Conventionally, single-layer ceramic capacitors such as disk and cylindrical-type capacitors have been primarily used. However, the use of multilayer ceramic capacitors (MLCCs) prevails nowadays, because of their properties of high capacitance with small size, high reliability, and excellent high-frequency characteristics. The quantity of shipment of MLCCs has grown annually due to the rapid increase of the production of cellular phones and computers, and the demand will further increase in the future.

Traditional MLCCs use copper for their external electrodes, noble metals such as silver or palladium for their inner electrodes and a ceramic acting as the dielectric. Over the past years, nickel electrodes have been replacing palladium bearing electrodes. This limited the reliance on palladium, which was relatively expensive, and enabled MLCC manufacturers to cost effectively produce MLCC in much higher capacitance ranges and compete with manufacturers of tantalum capacitors and other electrolytic capacitors.

Base metals used for manufacturing the electrodes are typically provided in paste or in powder. The base metals generally need to be sintered to form the internal electrodes of MLCCs. However, in order to produce relatively small MLCCs, to control the capacitance of the MLCCs in a relatively precise manner, and to facilitate the manufacturing of the MLCCs, the base metal needs to be provided in particles of a relatively small size, with a relatively low concentration of contaminants, and the size of the base metal needs to be relatively tightly controlled.

JP 2004-292950 has proposed a nickel-based fine powder in which the average particle diameter is ranging from 0.05 μm to 0.3 μm. However, the manufacturing process described in JP 2004-292950 makes use of a vapor phase reduction of nickel chloride vapor which results in a metallic powder contaminated with chlorine. In order to remove the chlorine, it is necessary to rinse with water, which increases particle aggregation and results in a particle size distribution which is skewed towards larger particle media sizes. This is why the number of particles obtained in JP 2004-292950 that have a particle diameter of 0.6 times or smaller than the average particle diameter is 10% or less and that particles having a size of 1 μm or more can be as high as 721 ppm.

JP 2001-073007 has proposed a nickel-based fine powder having an average particle diameter ranging from of 0.1 μm to 1.0 μm and having a coarse particle having a particle diameter of 2 μm or more of 700 ppm. Similarly to the situation in JP 2004-292950, this document makes use of a vapor phase reduction of nickel chloride vapor which results in a metallic powder contaminated with chlorine. In order to remove the chlorine, it is necessary to rinse with water, which increases particle aggregation and results in a particle size distribution which is also skewed towards larger particle media sizes.

The metallic powders and process of manufacturing same proposed in these documents are, therefore, not satisfactory due to the presence of larger particle size which increases the probability of defective products occurrence at the time of manufacturing MLCCs.

As such, there is still a need in the field for metallic powders for use in multilayer ceramic capacitors that have a better controlled smaller particle size distribution and that can be produced efficiently and cost effectively on an industrial scale.

SUMMARY OF DISCLOSURE

This Summary is provided to introduce a selection of concepts in a simplified form that are further described below in the Detailed Description. This Summary is not intended to identify key aspects or essential aspects of the claimed subject matter.

As embodied and broadly described herein, the present disclosure relates to a composition in particulate form for use in an electrode layer of a multilayer ceramic capacitor (MLCC), the composition comprising metal-based spherical particles doped with a doping agent that operates to increase the sintering temperature of the composition, and comprising less than 1000 ppm of carbon content, wherein the particles have a median size (D50) of ≤120 nm.

As embodied and broadly described herein, the present disclosure relates to a composition in particulate form for use in an electrode layer of a multilayer ceramic capacitor (MLCC), the composition comprising metal-based spherical particles doped with a doping agent that operates to increase the sintering temperature of the composition, and comprising less than 1000 ppm of carbon content, wherein the particles have a particle size distribution (PSD) of 20 nm to 350 nm.

As embodied and broadly described herein, the present disclosure relates to a composition in particulate form for use in an electrode layer of a multilayer ceramic capacitor (MLCC), the composition comprising metal-based spherical particles doped with a doping agent that operates to increase the sintering temperature of the composition, and comprising less than 1000 ppm of carbon content, wherein the particles have a particle size distribution (PSD) of 20 nm to 300 nm, with particles having a size >350 nm representing less than 1 ppm.

As embodied and broadly described herein, the present disclosure relates to a composition in particulate form for use in an electrode layer of a multilayer ceramic capacitor (MLCC), the composition comprising metal-based spherical particles doped with a doping agent that operates to increase the sintering temperature of the composition, and comprising less than 1000 ppm of carbon content, wherein the particles have a D99≤250 nm.

As embodied and broadly described herein, the present disclosure relates to a multilayer ceramic capacitor (MLCC) comprising a plurality of dielectric layers and electrode layers arranged to form a stack were the dielectric layers and the electrode layers alternate, one or more of the electrode layers being formed from a precursor layer including the composition as described herein.

As embodied and broadly described herein, the present disclosure relates to a process for obtaining a composition in particulate form for use in an electrode layer of a multilayer ceramic capacitor (MLCC), the process comprising providing metal-based particles doped with a doping agent that operates to increase the sintering temperature of the composition, vaporizing the metal-based particles to obtain the metal and doping agent in vapor form and cooling the metal and doping agent in vapor form so as to obtain the composition in particulate form for use in the MLCC wherein the composition comprises less than 1000 ppm of carbon content, and wherein the particles have a median size (D50) of ≤120 nm.

As embodied and broadly described herein, the present disclosure relates to a process for obtaining a composition in particulate form for use in an electrode layer of a multilayer ceramic capacitor (MLCC), the process comprising providing metal-based particles doped with a doping agent that operates to increase the sintering temperature of the composition, vaporizing the metal-based particles to obtain the metal and doping agent in vapor form and cooling the metal and doping agent in vapor form so as to obtain the composition in particulate form for use in the MLCC wherein the composition comprises less than 1000 ppm of carbon content, and wherein the particles have a particle size distribution (PSD) of 20 nm to 350 nm and a D90 of ≤200 nm.

As embodied and broadly described herein, the present disclosure relates to a process for obtaining a composition in particulate form for use in an electrode layer of a multilayer ceramic capacitor (MLCC), the process comprising providing metal-based particles doped with a doping agent that operates to increase the sintering temperature of the composition, vaporizing the metal-based particles to obtain the metal and doping agent in vapor form and cooling the metal and doping agent in vapor form so as to obtain the composition in particulate form for use in the MLCC wherein the composition comprises particles having a particle size distribution (PSD) of 20 nm to 300 nm, with particles having a size >350 nm representing less than 1 ppm.

As embodied and broadly described herein, the present disclosure relates to a process for obtaining a composition in particulate form for use in an electrode layer of a multilayer ceramic capacitor (MLCC), the process comprising providing metal-based precursor particles doped with a doping agent that operates to increase the sintering temperature of the composition, vaporizing the metal-based precursor particles to obtain the metal and doping agent in vapor form and cooling the metal and doping agent in vapor form so as to obtain the composition in particulate form for use in the MLCC wherein the composition comprises less than 1000 ppm of carbon content and particles having a D99≤250 nm.

As embodied and broadly described herein, the present disclosure relates to a process for providing the metal-based precursor particles doped with the doping agent as described herein, comprising mixing the doping agent with molten metal to obtain a molten metal-doping agent mixture; and atomizing the mixture to obtain the metal-based precursor particles doped with the doping agent.

All features of exemplary embodiments which are described in this disclosure and are not mutually exclusive can be combined with one another. Elements of one embodiment can be utilized in the other embodiments without further mention. Other aspects and features of the present technology will become apparent to those ordinarily skilled in the art upon review of the following description of specific embodiments in conjunction with the accompanying drawings.

BRIEF DESCRIPTION OF THE DRAWINGS

A detailed description of specific embodiments is provided herein below with reference to the accompanying drawings in which.

Figure 1:
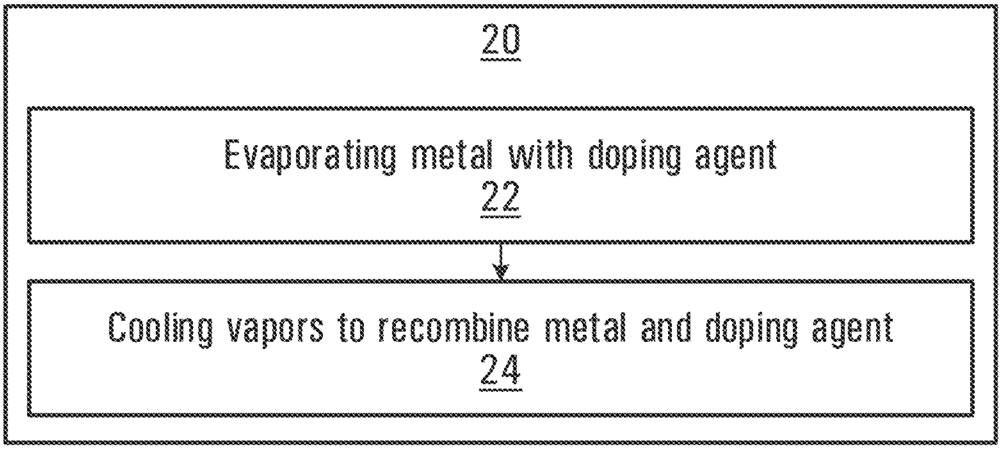
FIG. 1 is a flowchart illustrating a process for manufacturing a composition for use in a multi-layer ceramic capacitor (MLCC) in accordance with an embodiment of the present disclosure.

In the drawings, exemplary embodiments are illustrated by way of example. It is to be expressly understood that the description and drawings are only for the purpose of illustrating certain embodiments and are an aid for understanding. They are not intended to be a definition of the limits of the invention.

DETAILED DISCLOSURE

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which variations and additions do not depart from the present technology. Hence, the following description is intended to illustrate some particular embodiments of the technology, and not to exhaustively specify all permutations, combinations and variations thereof.

The present inventors have through extensive R&D work developed and designed compositions in particulate form for use as electrode material in multilayer ceramic capacitors (MLCCs) and a method of manufacturing same, where the compositions include particles having nanometric sizes that are more suitable to the increasing demands of the industry. Indeed, since the capacitance of a MLCC is dependent to the number of laminated layers and the thickness of the dielectric layer, it is advantageous to ensure that the MLCC be as thin as possible. This is where using the compositions in particulate form described herein in the manufacturing of the electrode layer disposed between dielectric layers can be advantageous in that these compositions have particles of smaller size with reduced coarse particles content than what has been known in the art so far.

The compositions described herein also have reduced content of contaminants, such as carbon, which can result in better electrochemical performances of MLCCs and/or which can result in less delamination or cracks during the manufacturing of MLCCs. Indeed, typically, during manufacturing of MLCC, carbon on the surface of metal-based particles may be removed during a "bake-out" step at a temperature exceeding 200° C., where excessive amounts of carbon can cause delamination and cracks in the MLCC. Such delamination and cracks are undesirable and their presence will typically cause the rejection of the MLCC, thus, reducing manufacturing productivity. Additionally or alternatively, when carbon is present inside the metal-based particles, the carbon may not be easily removed even through the above-mentioned "bake-out" step, thus, remaining in the MLCC. Without being bound by any theory, it is believed that this residual carbon may also cause deficiencies in the MLCC in terms of long term reliability, such for example, with respect to capacitance, DC bias, reliability, and the like.

Compositions Characteristics

In a broad non-limiting aspect, the compositions in particulate form for use in MLCCs of the present disclosure have metal-based particles, where the metal can be selected from silver, copper, lead, palladium, platinum, nickel, gold, cobalt, iron, cadmium, zirconium, molybdenum, rhodium, ruthenium, tantalum, titanium, tungsten, zirconium, niobium, and the like, as well as from alloys thereof. During the manufacturing of MLCCs, these compositions can be used as powders (i.e., in particulate form) or as slurry/pastes. Such slurry/pastes include binders suitable for the purpose of making electrodes in MLCCs, which are known in the art and, for conciseness sake, will not be further described here.

In some specific implementations, the metal-based particles of the present disclosure can also be doped with a doping agent, which operates to increase the sintering temperature of the metal-based particles during manufacture of the MLCC. During the manufacturing of MLCCs, typically, there is a sintering step where the electrode materials and dielectric ceramic materials are heated to temperatures which can reach up to about 1500° C. for a sufficient time period resulting in densification of the electrode materials and dielectric ceramic materials and achieving desirable conductivity properties. When these materials include particles, the sintering step will cause fusion at contact points between adjacent particles. Typically, metals used in the electrode materials have a significantly lower sintering temperature than that one of ceramic materials such that without the presence of at least a doping, which operates to increase the sintering temperature of the metal-based particles, there will be large differences in terms of respective sintering onset temperatures, which may result in microstructures and/or by-products that may negatively impact the MLCC and/or cause an increase in manufacturing rejections. For example, when using nickel-based particles as electrode material and $BaTiO_3$ as ceramic material, the sintering onset temperature for pure nickel being about 150° C. and the sintering onset temperature for $BaTiO_3$ to obtain desirable dielectric properties required for use in MLCCs being typically >1000° C., there is a significant sintering onset temperature gap that one must avoid. This is an example where the presence of a doping agent, which operates to increase the sintering temperature of the metal-based particles during manufacture of the MLCCs, is advantageous.

The doping agent can be a single material or a blend of different materials. For example, the doping agent can operate to increase the onset temperature (beginning of sintering) and/or increase the sintering offset temperature (end of sintering). In a specific example of implementation, the amount of doping agent and/or the nature of the doping agent is selected such that the onset temperature (beginning of sintering) and/or the sintering offset temperature (end of sintering) of the metal-based particles sufficiently overlaps with the sintering temperature range of the ceramic materials.

In some embodiments, the doping agent can be homogenously distributed in the metal-based particles and/or at the surface of the particles. In other embodiments, the doping agent can be heterogeneously distributed in the metal-based particles and/or at the surface of the particles. In yet other embodiments, the doping agent can be homogenously distributed in the metal-based particles and heterogeneously distributed at the surface of the particles. In yet other embodiments, the doping agent can be heterogeneously distributed in the metal-based particles and homogenously distributed at the surface of the particles.

In some specific implementations, the doping agent is a high melting point metal. Examples of high melting point metal, include, but are not limited to chromium, vanadium, titanium, zirconium, niobium, tantalum, platinum, boron, ruthenium, molybdenum, tungsten, rhodium, iridium, osmium, rhenium, and their alloys or mixtures thereof. In some other embodiments, the doping agent is a metal with a melting point higher than the melting point of nickel. In some embodiments, the high melting point metal is an oxide or a salt.

In some specific implementations, the doping agent is sulfur.

In some specific implementations, the doping agent in the metal-based particles includes from 0.01 to 0.5 wt. % of sulfur content.

In some specific implementations, the compositions of the present disclosure include nickel-based particles doped with sulfur.

In some specific implementations, the compositions of the present disclosure are prepared according to a process that controls the carbon content, such that compositions include <1200 ppm. For example, the compositions of the present disclosure can include <1000 ppm, <900 ppm, <800 ppm, <700 ppm, <600 ppm, <500 ppm, <400 ppm, <300 ppm, <200, or <100 ppm of carbon content.

In some specific implementations, the compositions of the present disclosure are prepared according to a process that controls the oxygen content in the particles to obtain satisfactory electrochemical performance of the MLCC.

The presence of an oxidation layer on the surface of the herein described metal-based particles can also positively modify dispersion and/or flowability properties of the compositions in particulate form.

In some specific implementations, the compositions of the present disclosure are prepared according to a process that controls the oxygen content in the particles to up to 5 wt. % oxygen content. For example, from 0.1 wt. % to 5 wt. %, 0.1 wt. % to 3.5 wt. %, 0.1 wt. % to 2.0 wt. %, 0.1 wt. % to 1.5 wt. %, 0.1 wt. % to 0.6 wt. %, 0.2 wt. % to 5 wt. %, 0.2 wt. % to 3.5 wt. %, 0.2 wt. % to 2.0 wt. %, 0.2 wt. % to 1.5 wt. %, 0.2 wt. % to 0.6 wt. % oxygen content.

Without being bound by any theory, the present inventors believe that control over the oxygen content can be beneficial for a number of reasons. For example, when the metal-based particles are nickel-based particles, if the nickel electrode is oxidized over a threshold level, this will cause the presence of structural defects by volume expansion during the MLCC manufacturing process. That is, when Ni is changed into NiO, unit cell volume increases by 169%. However, when the oxygen content is mainly contained in a surface layer disposed on the metal-based particles, it results in an improvement in the stability and thermal behavior of the metal.

In some specific implementations, the compositions of the present disclosure include metal-based particles that include an oxidation layer on at least a portion of the particle surface. In some embodiments, the oxidation layer completely covers the particle surface. For example, the main portion or all of the oxygen content discussed previously may be included the oxidation layer. In some embodiments, the oxidation layer has a thickness of less than 15 nm. For example, the oxidation layer can have a thickness of from 2 nm to 10 nm, or from 2 nm to 5 nm, such as for example a 3 nm or 4 nm oxidation layer. The person of skill will readily understand that the thickness of the oxidation layer may be an average thickness in that it may vary in thickness along the surface of the metal-based particle. Accordingly, the thickness may be an average thickness value as measured by electron microscopy techniques.

In some embodiments, when the metal-based particles are nickel-based particles doped with sulfur, the oxidation layer can include nickel oxide and nickel sulfide.

In some specific implementations, the compositions of the present disclosure include metal-based particles that have nanometric sizes. For example, the composition may include particles having a particle size distribution (PSD) of 15 nm to 350 nm (prior to classification) or a PSD of 20 nm to 350 nm (after classification). Such PSD is, contrary to what is obtained with known processes in the art, tightly controlled such that, for example, the particles have sizes that are skewed towards smaller sizes instead of having sizes skewed towards coarser sizes. There are clear technical benefits in obtaining such sizes (as discussed previously in this text) as well as economic benefits: when the composition in particulate form coming out of the manufacturing process has less coarse sizes, there is less wasted material (material which would not make the cut-off classification values) and as such, yields are increased.

For example, the composition may include one or more of the following particle size features:

- PSD of 20 nm to 350 nm, or 20 nm to 300 nm, or 20 nm to 200 nm;
- D90≤200 nm, or D90≤150 nm, D90≤130 nm;
- median size (D50) of ≤120 nm, or median size (D50) of ≤100 nm, or median size (D50) of ≤80 nm, or median size (D50) of ≤50 nm;
- particles having a size >350 nm representing less than 1 ppm;
- D99≤250 nm, or D99≤230 nm;
- less than 3 particles having a size >1 μm as determined from a scanning electronic microscope (SEM) image of 5000× of the composition, or less than 2 particles having a size >1 μm as determined from a scanning electronic microscope (SEM) image of 5000× of the composition, or 1 or no particle having a size >1 μm as determined from a scanning electronic microscope (SEM) image of 5000× of the composition;
- less than 3 particles having a size >650 nm in a scanning electronic microscope image of 5000× of the composition, or less than 2 particles having a size >1 μm as determined from a scanning electronic microscope (SEM) image of 5000× of the composition, or 1 or no particle having a size >1 μm as determined from a scanning electronic microscope (SEM) image of 5000× of the composition less than 3 particles having a size >350 nm in a scanning electronic microscope image of 5000× of the composition, or less than 2 particles having a size >1 μm as determined from a scanning electronic microscope (SEM) image of 5000× of the composition, or 1 or no particle having a size >1 μm as determined from a scanning electronic microscope (SEM) image of 5000× of the composition.

The person of skill will appreciate that the SEM image is an image of a predetermined area of the composition being analyzed, which will vary depending on at least the D50 of the composition to ensure accuracy and/or statistical significance. For example, a D50 of 120 nm can require a 5 μm per 5 μm area, whereas a D50 of 80 nm can require a 3 μm per 3 μm area and a D50 of 50 nm can require a 2 μm per 2 μm area of the composition.

Particle size features of a composition in particulate form can be determined using techniques well known in the art, such as, but not limited to, laser diffraction spectroscopy, transmission electron microscopy, scanning electron microscopy (SEM), and the like. Such techniques are well known and for conciseness sake, will not be further described here.

Multilayer Ceramic Capacitor (MLCC)

In a broad non-limiting aspect, the compositions in particulate form described herein allow one to manufacture MLCCs having advantageous properties. MLCCs typically include a ceramic body including dielectric layers. MLCCs also include a plurality of internal electrode layers disposed within the ceramic body, having at least one of the dielectric layers interposed there between, stacked along a thickness direction, being parallel with respect to an external surface, such as a mounting surface.

Figure 6:
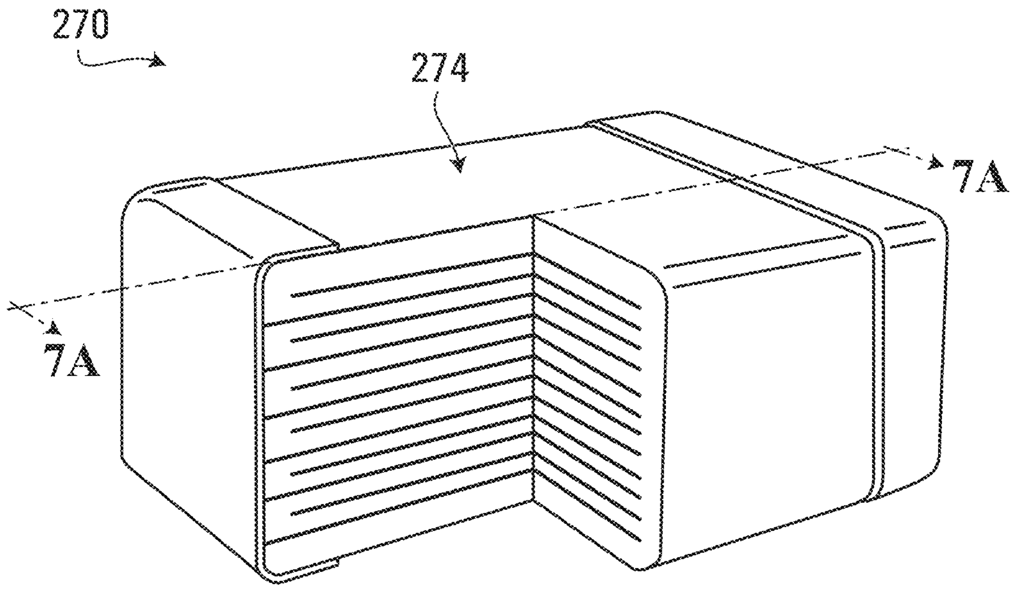
FIG. 6 is a schematic representation of a MLCC in accordance with an embodiment of the present disclosure.
Figure 7:
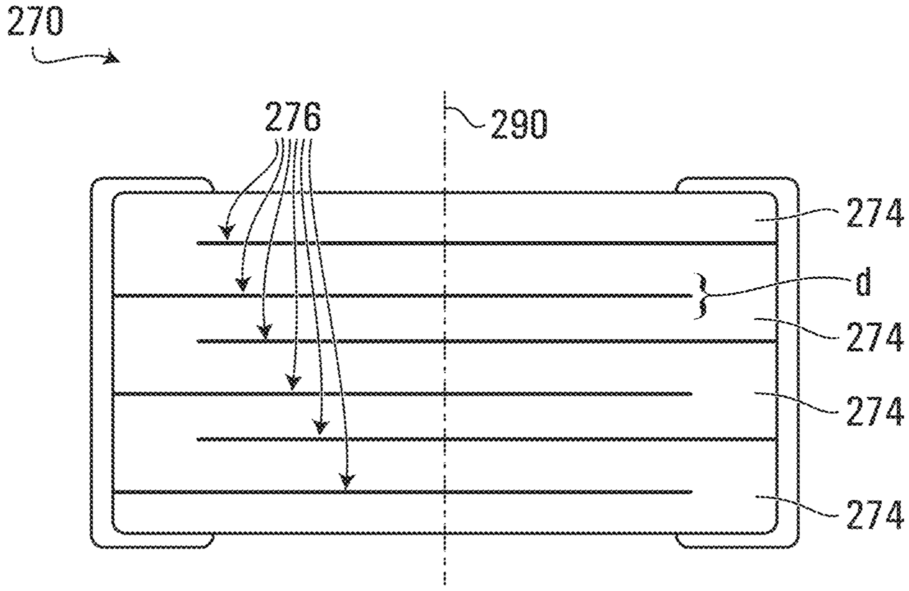
FIG. 7 is a cross section of the MLCC of FIG. 6 in accordance with an embodiment of the present disclosure.
Figure 8:
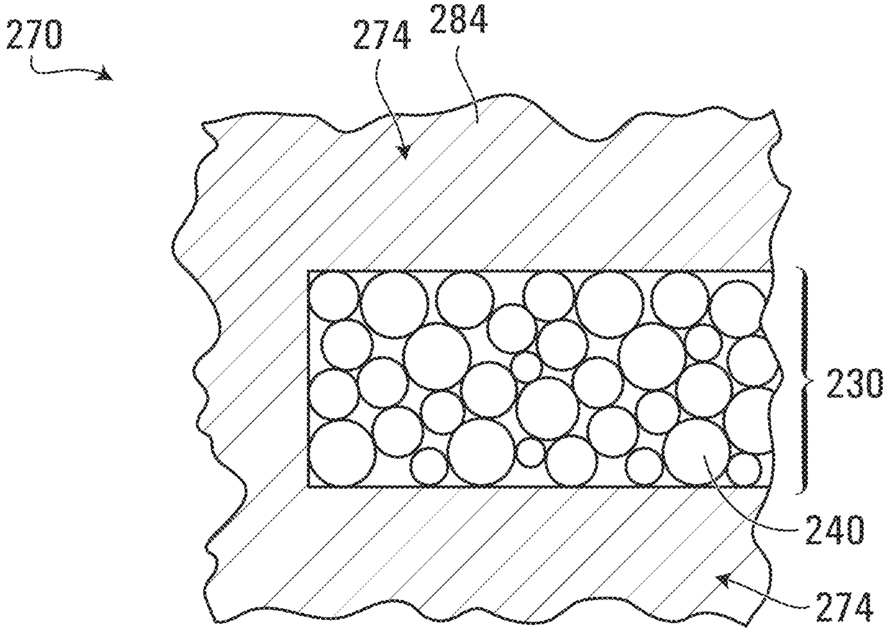
FIG. 8 is a schematic representation of a cross section of the MLCC of FIG. 6 including an internal electrode layer and dielectric layers, before a sintering process, in accordance with an embodiment of the present disclosure.
Figure 9A:
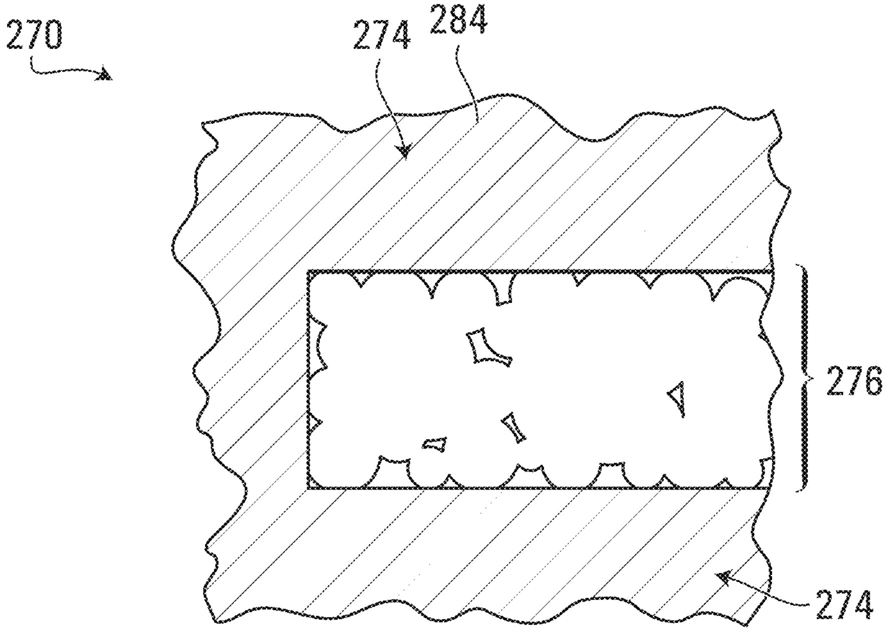
FIG. 9A is a schematic representation of the cross section of the MLCC of FIG. 8 after the sintering process, in accordance with an embodiment of the present disclosure.

FIG. 6 and FIG. 7 illustrate MLCC 270 including a plurality of dielectric layers 274 in accordance with an embodiment of the present disclosure. The dielectric layers 274 may include a ceramic material having high permittivity, for example, a composition including barium titanate ($BaTiO_3$)-based particles or strontium titanate ($SrTiO_3$)-based particles. MLCC 270 includes a plurality of internal electrodes 276, where each internal electrode 276 is disposed between two dielectric layers 274 which comprise ceramic material 284 (as shown in FIG. 8). The internal electrodes 276 are made using a composition 230 comprising metal-based particles 240. FIG. 8 shows a plurality of particles 240 before sintering. FIG. 9A illustrates the MLCC 270 of FIG. 8, but after sintering, where the particles 240 of composition 230 have fused at contact points between the particles, partially deforming to the point of not being perfectly spherical any more, as best shown in the picture illustrated in FIG. 9B. The person of skill will readily realize that the composition 230 can take the form of a slurry/paste which is spread on the surface of the dielectric layers 274, which slurry/paste may include a number of additional ingredients such as organic solvent(s) and binder resin(s).

Typically, the capacitance of a MLCC is dependent to the number of laminated layers and to the thickness of the dielectric layer, and as such, it is advantageous to ensure that the MLCC be as thin as possible. This is where using the composition in particulate form described herein in the manufacturing of the electrode layers disposed between dielectric layers can be advantageous in that this composition has particles of smaller size with reduced coarse particles content than what has been known in the art so far, thus, allowing one to reduce the overall thickness of MLCCs.

For example, when using the composition of the present disclosure, one can manufacture a MLCC where on a cross section 7A of the ceramic body in a direction perpendicular to the mounting surface, as shown for example in FIG. 6 and FIG. 7, two adjacent dielectric layers 274 separated by an internal electrode layer 276 can have an average distance d of <800 nm between respective points intersecting an axis 290 perpendicular to the mounting surface. This distance d can be for example <500 nm, <400 nm, <300 nm, or a distance of >100 nm. This distance d is shown in FIG. 9B.

Figure 9B:
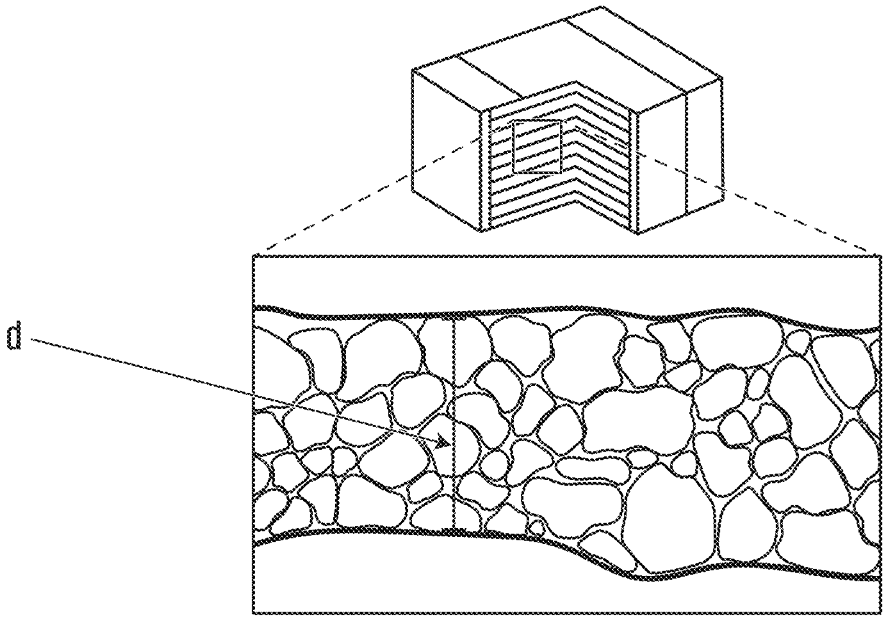
FIG. 9B is a schematic representation of typical scanning electronic microscope (SEM) images that can be obtained from a cross section of the MLCC of FIG. 9A, in accordance with an embodiment of the present disclosure.

In order to manufacture standardized MLCCs, each internal electrode 276 as illustrated in FIGS. 9A and 9B requires a certain average number of particles 240 to allow the internal electrodes 276 to have relatively uniform thickness, which is advantageously as thin as possible. The average number of particles 240 of internal electrode 276 may be assessed in a number of ways. For example, one can dissect the MLCC along axes 7A as shown in FIG. 6 to obtain a cross section of the ceramic body in a direction perpendicular to the external surface as shown in FIG. 7. In this cross section, one can determine the number of particles 240 in a number of electrodes 276 over a pre-determined number (e.g., 25, 36, 64, etc.) of locations which cross axis 290 which is perpendicular to the plurality of electrodes 276 as shown in FIG. 7 and averaging the obtained values. The composition in particulate form of the present disclosure has a particle size distribution such that an electrode layer interposed between two adjacent dielectric layers prior to a sintering process includes from 2 to 8 metal-based spherical particles disposed in a direction parallel to the axis 290, such as from 3 to 5 metal-based spherical particles.

If the average number of particles 240 in a given electrode layer 276 throughout various locations crossing respective axes 290 is not consistent throughout, e.g., the standard deviation is too high, some portions of the given internal electrode 276 will significantly be thicker than other portions, which may translate into inconsistent electrical properties and/or out-of-spec MLCC. At least for this reason, the herein described composition in particulate form having the previously discussed size features is advantageous—in the present invention, there is clearly more control over the particle size features and, thus, less variability in terms of electrical properties and thickness of MLCC. This control over the particle size features thus may result in less out-of-spec MLCC, thus, reducing defective fractions in production batches and increasing productivity.

The person of skill will readily understand that the metal-based particles will not retain the spherical shape after sintering (as shown in FIG. 9B), since the particles are somewhat deformed due to material fusion and compression at the contact points between the particles. Nevertheless, after sintering, the particles are still recognizable as more or less discrete particles and one can typically still assess the number of particles disposed in a direction parallel to the cross section.

Process of Manufacture of the Composition

In a broad non-limiting aspect, the compositions in particulate form described herein can be manufactured using a process that vaporizes precursor materials so as to obtain a gas containing the precursors in vapor form. The present inventors have developed a process which allows one to control the residence time of the precursor materials in the vaporization zone so as to sufficiently vaporize the precursors to ensure that there are no remaining precursors in solid form after the manufacturing process, which can be undesirable in particular when such precursors include particles in micron size that would find their way into the composition in particulate form and thus skew its PSD towards coarser sizes.

The present inventors have also developed a way to control the cooling rate of the gas containing the precursors in vapor form so as to obtain a herein described composition in particulate form having the desired particle size features discussed previously.

FIG. 1 illustrates a process 20 for manufacturing a composition in particulate form described herein in accordance with an embodiment of the present disclosure. The process 20 includes step 22 of evaporating precursor materials (e.g., metal and doping agent) to obtain a gas containing the precursor materials in vapor form. For example, step 22 may be implemented using an inductively coupled plasma torch (ICP torch) (e.g., TEKNA PL-50, PN-50, PL-35, PN-35, PL-70, PN-70, PN-100) or a direct current (DC) plasma torch (e.g., those commercialized by Praxair, Oerlikon-Metco, Pyrogenesis or Northwest Mettech).

Advantageously, the process 20 is designed so as to optimize the residence time of the precursor materials into the plasma reaction zone of the torch to cause sufficient evaporation of the precursor materials to ensure that there are no precursor materials in solid form entrained in the gas containing the precursor materials in vapor form. For example, when the process 20 is implemented in an ICP torch, precursor materials in solid form entrained in the gas containing the precursor materials in vapor form could interfere with the desired PSD and result in particles having coarse particle sizes.

In some embodiments, the residence time of the precursor materials into the plasma reaction zone of the torch may be controlled and optimized by controlling the precursor materials feeding rate into the plasma reaction zone. In some embodiments, the precursor materials feeding rate may be controlled through controlling operational parameters for the feeding device, such as motor RPM if it is a rotating distribution device, vibration parameters if it is a vibration motor device, and the like. For example, the present inventors have discovered that a feeding rate in the range of 10 to 35 g/min of precursor materials in particle form through a ¼ inch feeding tube which is consistent in time (not varying in time by more than 1%) affords best results with an ICP torch.

The present inventors have also discovered that while using a carrier gas to transport precursor materials from the feeding inlet into the plasma reaction zone at more or less high speeds can be useful to prevent settlement within the transport circuit and thus prevent clogging of the system, a carrier gas flow rate which is too high results in particle speeds which are also too high, thus, reducing residence time of the precursor materials into the plasma reaction zone. For example, the present inventors have discovered that a flow rate of carrier gas at a consistent (i.e., not varying in time by more than 1%) flow rate≤10 L/min in a feeding tube of a ¼ inch inner diameter. The carrier gas flow rate can be manually controlled or using a computerized system.

In some embodiments, an additive gas (e.g., oxygen) can be incorporated in a controlled manner into the process so as to obtain from 0.1 wt. % to 5 wt. % oxygen content in the metal-based particles. For example, the additive gas (e.g., oxygen) can cause formation of an oxide layer on the surface of particles having a thickness of less than 15 nm, such as less than 10 nm, less than 5 nm, such as 2 to 4 nm. The additive gas (e.g., oxygen) can have a consistent (i.e., not varying in time by more than 1%) flow rate so as to obtain such oxygen content and/or oxidative layer. For example, the additive gas flow rate can be in the range of 0.5 to 1.5 L/min.

There are several ways of obtaining the precursor materials used in step 22. One embodiment will now be discussed with reference to FIG. 2.

Figure 2:
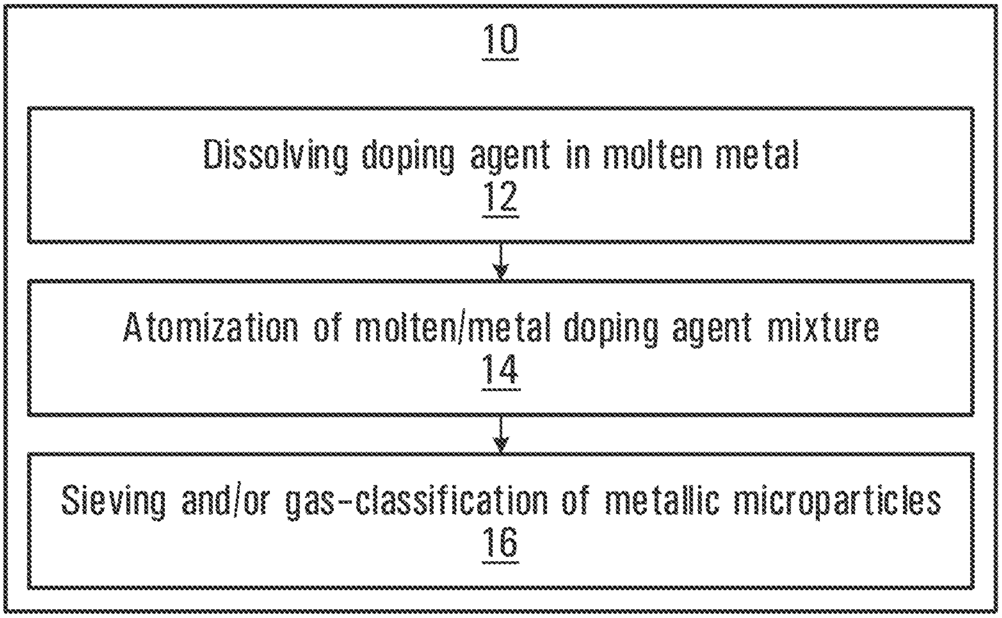
FIG. 2 is a flowchart illustrating a process for obtaining metal-based precursor particles for use in the process of FIG. 1 in accordance with an embodiment of the present disclosure.
Figure 3:
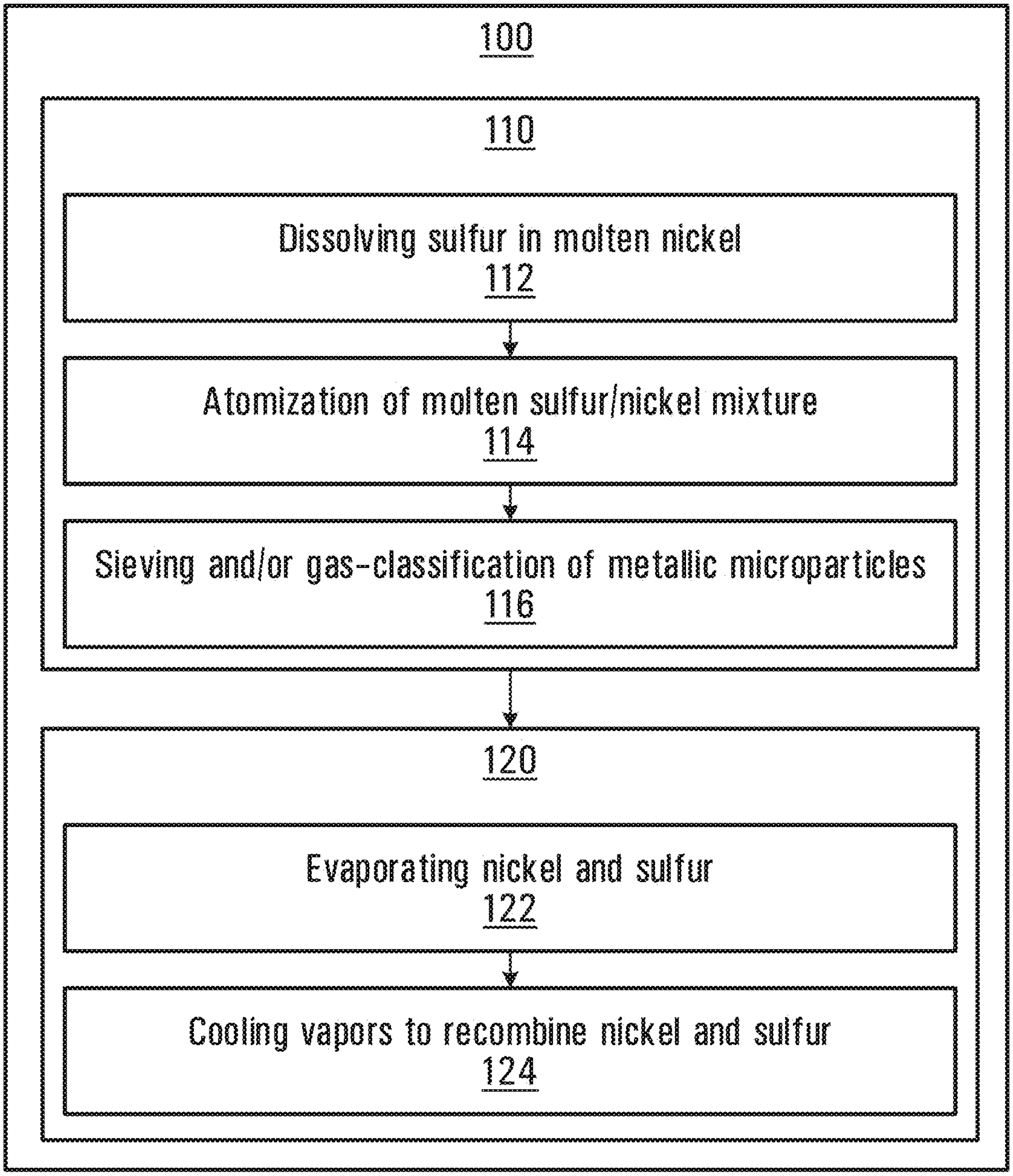
FIG. 3 is a flowchart illustrating a process implementing the processes of FIG. 1 and FIG. 2 for obtaining nickel-based particles doped with sulfur in accordance with an embodiment of the present disclosure.

FIG. 2 outlines an atomization process 10, which can be used for obtaining metal-based precursor particles doped with the doping agent in accordance with an embodiment of the present disclosure. Atomization processes are known in the art, such as gas atomization, DC plasma atomization, inductively coupled plasma atomization, and the like, and as such, details of the systems used to implement the atomization process 10 will not be described in great detail here.

The atomization process 10 includes a step 12 of dissolving the doping agent in molten metal to obtain a molten metal/doping agent mixture. As discussed previously, the doping agent may be a single doping agent or a blend of doping agents. Optionally, the process 10 may include a step (not shown) of assessing a concentration of doping agent present in the molten metal/doping agent mixture and, if necessary, adjusting the concentration of doping agent to compensate for any loss of doping agent through, for example, volatilization caused by the high melting temperatures used to obtain the mixture. The doping agent concentration in the mixture is controlled so as to obtain metal-based precursor particles doped with, for example, from 0.01 to 0.5 wt. % of doping agent.

The molten metal/doping agent mixture is then atomized at a step 14 to form metal-based precursor particles doped with the doping agent. Typically, the precursor particles obtained at this step will have a PSD including micron sizes. Typically, the metal-based precursor particles obtained with atomization process 10 are substantially spherical. In other words, the particles have a degree of deviation from perfect spherical shape that is sufficiently small so as to not measurably detract therefrom. The exact degree of deviation allowable may in some cases depend on the specific context.

The process 10 may then include a sieving (e.g., using sieving membranes, or mesh or cloth) or gas-classification step 16 to retain a particle size distribution of interest. In some instances, an inert gas classification system can be used to obtain the desired particle size distribution. In some embodiments, the metal-based precursor particles doped with the doping agent have a particle size distribution (PSD) of from 1 μm to 200 μm, or any PSD within such range. In some embodiments, the metal-based precursor particles doped with the doping agent have an average median (D50) size in the range of from 1 μm to 25 μm, or from 1 μm to 15 μm, or from 1 μm to 10 μm, or from 5 μm to 25 μm, or from 5 μm to 15 μm, or from 5 μm to 10 μm, and the like. In some embodiments, the metal-based precursor particles doped with the doping agent have a D90 particle size distribution <50 μm, or <45 μm, or <40 μm, or <35 μm, or <30 μm, or <25 μm and the like. In some embodiment, the metal-based precursor particles doped with the doping agent have a specific surface area (SSA) as measured by the Brunauer-Emmett-Teller adsorption method (BET) that is at least 0.15 $m^2/g$, or at least 0.20 $m^2/g$, or at least 0.25 $m^2/g$, and the like. Techniques for sieving (e.g., using sieving membranes, or mesh or cloth) or gas-classification are well known in the art, and as such, will not be further described here.

In some specific implementations, the process 10 is implemented in a system that does not make use of graphite-containing elements in zones of high heat so as to minimize contamination of the metal-based precursor particles with high contents of carbon. For example, the metal-based precursor particles produced with the atomization process 10 will contain less than 1200 ppm, or less than 1000 ppm, or less than 900 ppm, or less than 800 ppm, or less than 700 ppm, or less than 600 ppm, or less than 500 ppm, or less than 400 ppm, or less than 300 ppm, or less than 200 ppm of carbon content. Examples of suitable atomization systems for implementing such process are described, for example, in any one of U.S. Pat. Nos. 9,718,131; 5,707,419; WO 2011/054113, WO 2017/011900, WO 2017/070779; WO 2017/177315; and WO 2016/191854, which are all incorporated herein by reference for all purposes.

In some embodiment, the metal-based precursor particles produced with the atomization process 10 will contain from 0.1 wt. % to 5 wt. % oxygen content, such as up to 3.5 wt. %, up to 2.0 wt. %, up to 1.5 wt. %, up to 0.6 wt. %, and the like.

In some embodiment, the metal-based precursor particles produced with the atomization process 10 are substantially pure. In other words, the metal-based precursor particles do not include significant undesired components levels, such as <0.5 wt. %, <1 wt. %, <2 wt. %, <3 wt. %, <4 wt. %, <5 wt. %, <6 wt. %, <7 wt. %, <8 wt. %, <9 wt. % or <10 wt. % undesired components.

As the person of skill will readily understand, the process 10 advantageously produces metal-based particles which are used as carriers for the doping agent.

Returning to FIG. 1, the process 20 for manufacturing the composition in particulate form includes a step 24 of cooling the gas containing the precursor materials in vapor form so as to cause the metal and doping agent to recombine and obtain a composition in particulate form. For instance, in some examples, a cooling rate may be controlled such as to obtain the metal-based particles of the present disclosure. In some instances, the cooling rate may be controlled such that the gas temperatures are reduced to below about 350° C. In some instances, vaporized metal and doping agent are cooled down in a controlled manner using a quench gas having a consistent (i.e., not varying in time by more than 1%) flow rate so as to obtain the desired particle size distribution. For example, the quench gas can be incorporated into the process at a consistent flow rate in the range of 1000 to 8000 L/min so as to obtain the desired particle size distribution.

Figure 10:
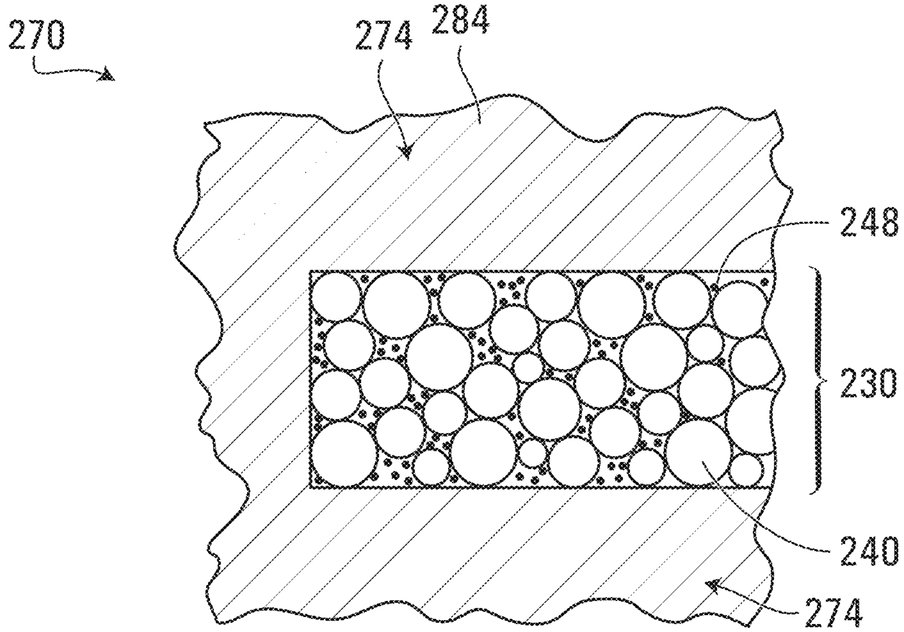
FIG. 10 is a schematic representation of the cross section of the MLCC of FIG. 8 where the electrode layer includes fine contaminant particles, in accordance with an embodiment of the present disclosure.
Figure 11:
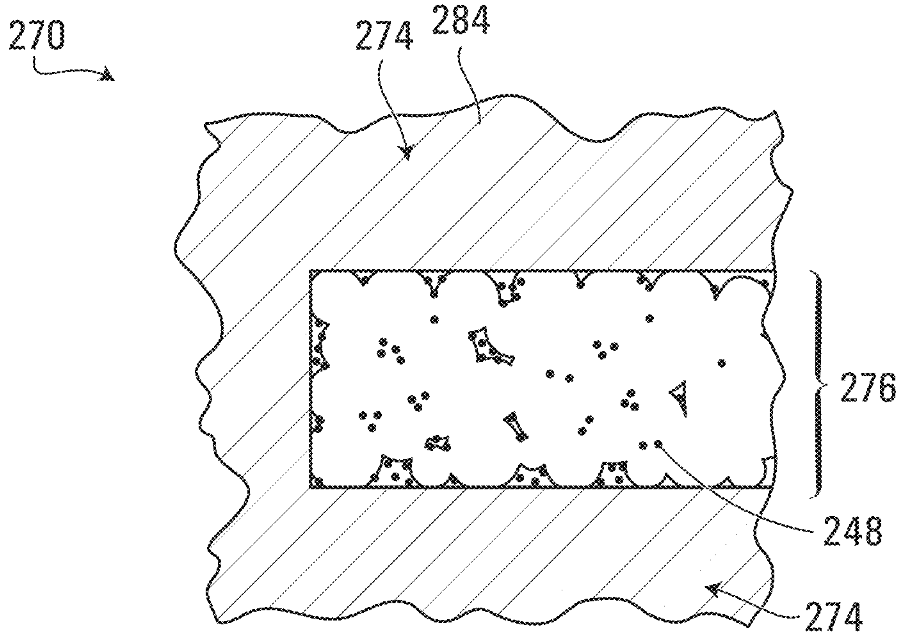
FIG. 11 is a schematic representation of the cross section of the MLCC of FIG. 10, after the sintering process, in accordance with an embodiment of the present disclosure.
Figure 12:
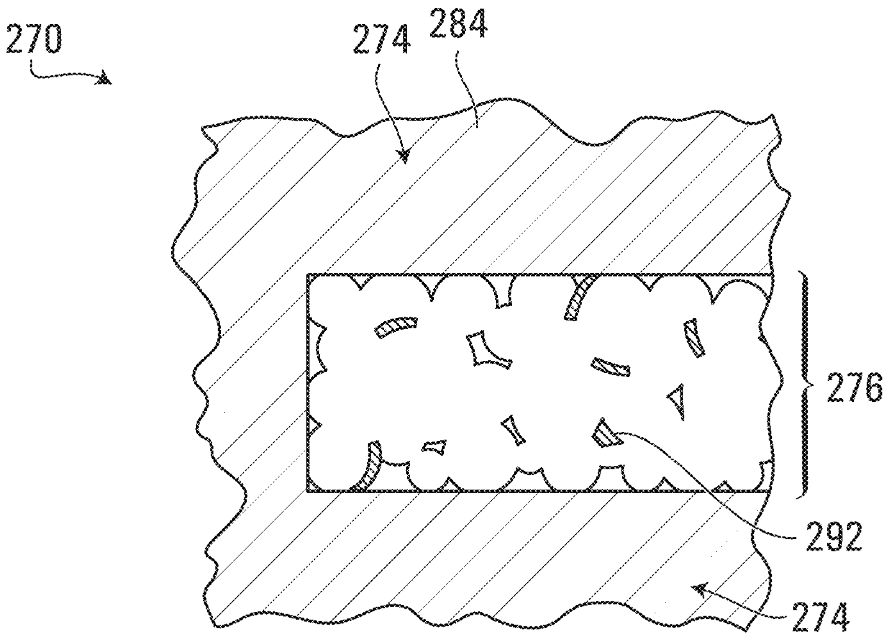
FIG. 12 is a schematic representation of the cross section of the MLCC of FIG. 10, after the sintering process, comprising undesirable compounds, in accordance with an embodiment of the present disclosure.

The process 20 may also include a classification step (not show) to discard particles having a size <20 nm such as particles 248 illustrated in FIG. 10. Without being bound by any theory, the presence of particles 248 may be problematic in that their presence may interfere with additives that are typically added to the electrode material slurry/paste when manufacturing MLCC, such as $BaTiO_3$ which typically also have a size <20 nm. In other words, when manufacturing MLCC, it is desirable to have the additives fill void spaces between particles 240 and as such, it is desirable to reduce as possible the content of other particles of similar size which would prevent these additives from occupying these void spaces. Alternatively or additionally, and again without being bound by any theory, presence of particles 248 having a size <20 nm in the composition 230 may be detrimental during the sintering step in that these may chemically react with other elements causing a presence of undesirable compounds 290 into the internal electrodes 276 as shown in FIG. 12, and/or fuse with adjacent particles 240 (e.g. about a fused area between metal-based particles 240) as shown in FIG. 11, thereby altering the microstructure of the internal electrodes 276, harming the electric properties of the internal electrodes 276, and/or diminishing the quality of the internal electrode 276 after sintering.

Figure 13A:
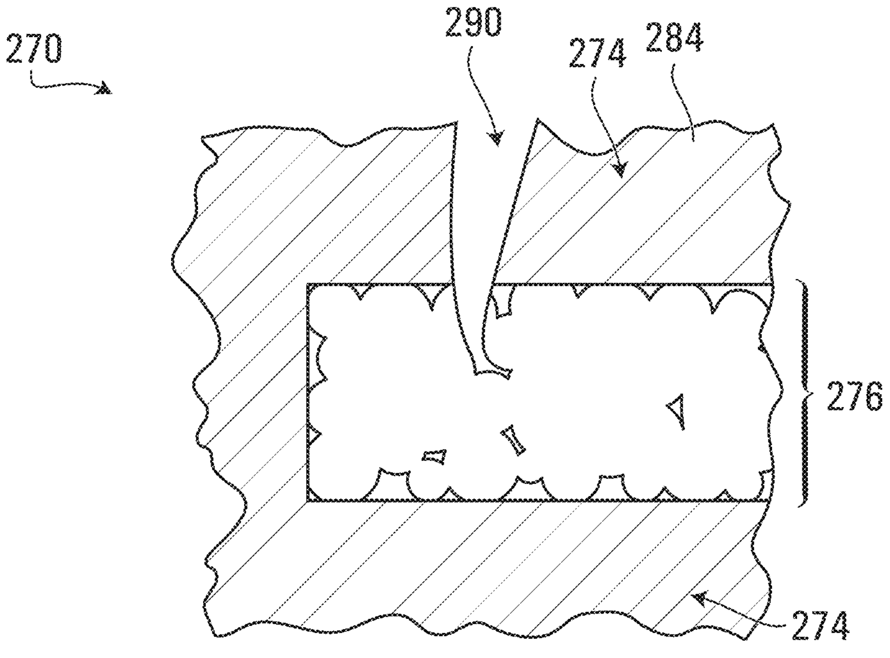
FIG. 13A is a first schematic representation of the cross section of the MLCC of FIG. 8, after the sintering process, comprising a cracked MLCC, in accordance with an embodiment of the present disclosure.
Figure 13B:
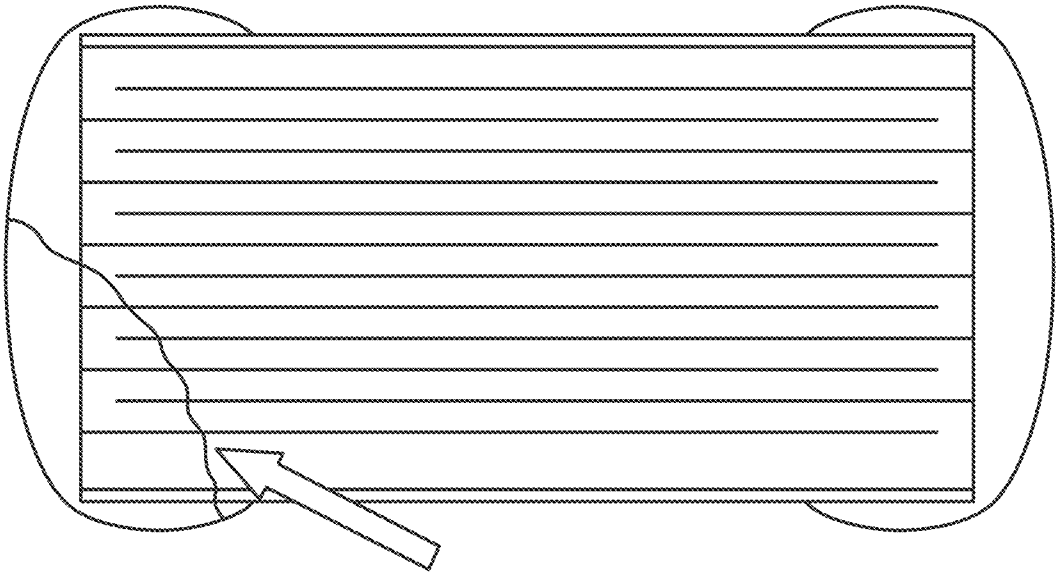
FIG. 13B is a second schematic representation of the cross section of the MLCC of FIG. 8, after the sintering process, comprising a cracked MLCC, in accordance with an embodiment of the present disclosure.
Figure 14:
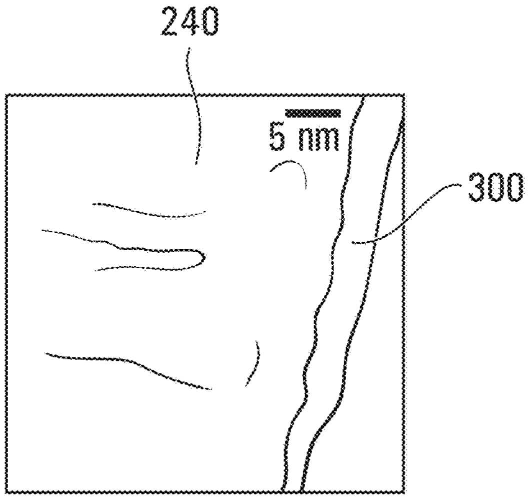
FIG. 14 is a schematic representation of a typical scanning electronic microscope (SEM) image of a metal-based particle showing an oxidation layer on its surface in accordance with an embodiment of the present disclosure.

The process 20 thus offers clear advantages in preparing MLCC with reduced likelihood of rejections. As discussed previously, the process 20 reduces contaminant contents, such as carbon (to levels such as <1000 ppm), which when present in sufficiently high levels (>1400 ppm) in the composition 230, may induce the presence of cracks 290, as illustrated in FIG. 13A and shown in FIG. 13B, which increases rejection of MLCC.

Definitions

Unless otherwise defined, all technical and scientific terms used herein have the same meaning as commonly understood by a person of ordinary skill in the art to which the present invention pertains. As used herein, and unless stated otherwise or required otherwise by context, each of the following terms shall have the definition set forth below.

As used herein, the term "dopant" and the expression "doping agent" are used interchangeably and refer to a trace impurity elements that is inserted into a substance (in very low concentrations) to modify the thermodynamic and/or electrical and/or optical properties of the substance.

As used herein, the term "alloy" refers to a mixture of metals or a mixture of a metal and another element. Alloys are defined by a metallic bonding character. An alloy may be a solid solution of metal elements (a single phase) or a mixture of metallic phases (two or more solutions). Intermetallic compounds are alloys with a defined stoichiometry and crystal structure.

As used herein, the term "plasma" refers to a state of matter in which an ionized gaseous substance becomes highly electrically conductive to the point that long-range electric and magnetic fields dominate the behavior of the matter. Plasma is typically artificially generated by heating neutral gases or by subjecting that gas to a strong electromagnetic field.

The expressions "plasma torch", "plasma arc", "plasma gun" and "plasma cutter" are used herein interchangeably and refer to a device for generating a direct flow of plasma.

As used herein, the abbreviation "μm" designates micrometers and the abbreviation "nm" designates nanometers.

As used herein, the expression "particle size distribution" or "PSD" defines the relative amount of particles present according to size. The way PSD is determined in the present disclosure is with either laser diffraction spectroscopy and/or field emission gun scanning electron microscopy (FEG-SEM), where powder is separated on sieves of different sizes. For example, D90=150 nm indicates that 90% of the particles have a size which is smaller than 150 nm.

EXAMPLES

The examples below are given so as to illustrate the practice of various embodiments of the present disclosure. They are not intended to limit or define the entire scope of this disclosure. It should be appreciated that the disclosure is not limited to the particular embodiments described and illustrated herein but includes all modifications and variations falling within the scope of the disclosure as defined in the appended embodiments.

Example 1

In this example, a composition comprising nickel-based precursor particles doped with sulfur was prepared in accordance with an embodiment of the present disclosure.

Briefly, a nickel source and sulfur source were loaded in a furnace and heated to the melting temperatures of sulfur (115-440° C.). The temperature was held for sufficient time to allow reaction of liquid sulfur with nickel to form NiS or $Ni_3S_2$. When the reaction was deemed complete, i.e., all sulfur was converted in the form of NiS, the temperature was raised to the melting temperature of nickel (1400-1500° C.) to obtain a melted mixture. The melted mixture was then gas-atomized to obtain a composition comprising nickel-based precursor particles doped with 0.01 to 0.5 wt. % of sulfur content. The process was repeated three times and the results are reproduced in the Table 1, where the composition obtained in process #3 was sieved into fine and coarse particle sub-fractions.

All compositions were analyzed by LECO analysis to determine O, C, N and H contents and by laser diffraction spectroscopy to determine particle size distribution features.

TABLE 1

| Process | S content | PSD (μm) | | | O | C | N | H |
|---|---|---|---|---|---|---|---|---|
| # | wt. % | D10 | D50 | D90 | wt. % | wt. % | wt. % | wt. % |
| 1 | 0.280 | 25.7 | 62.1 | 103 | 1.1 | 0.082 | na | na |
| 2 | 0.320 | 14.5 | 40.4 | 104 | 1.5 | 0.280 | na | na |
| 3 (fine) | 0.033 | 6.6 | 14.3 | 43.2 | 0.55 | 0.012 | na | na |
| 3 (coarse) | 0.020 | 22.5 | 52.7 | 108.8 | 0.50 | 0.005 | na | na |

Example 2

In this example, a composition comprising nickel-based particles doped with sulfur was prepared in accordance with an embodiment of the present disclosure.

Figure 4:
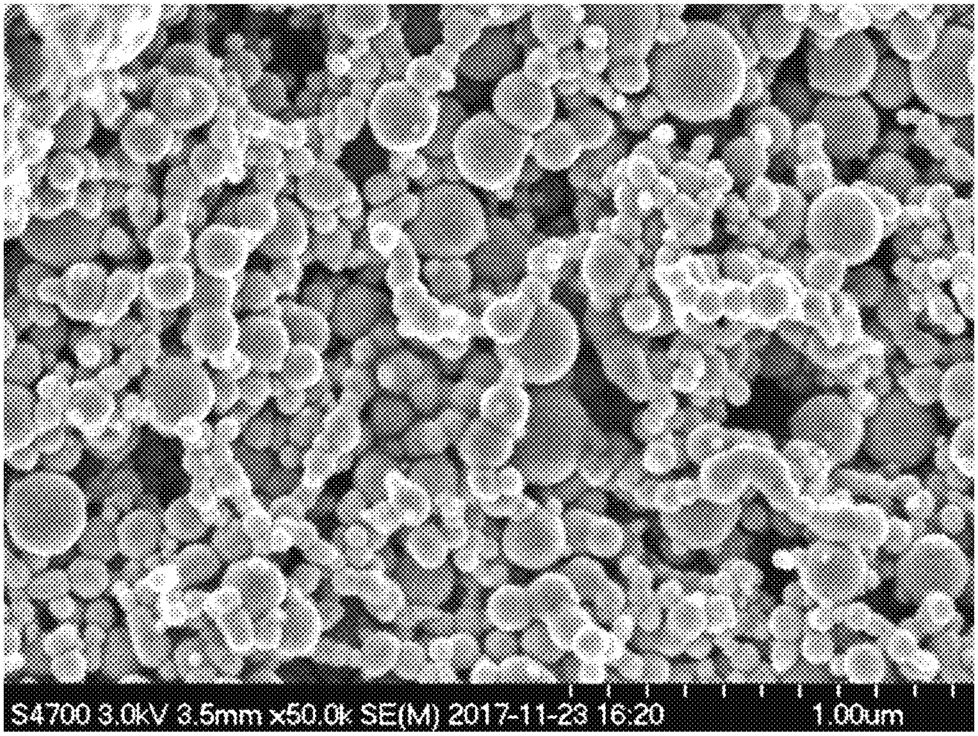
FIG. 4 is a scanning electronic microscope image of a composition comprising nickel-based particles obtained with the process of FIG. 1.

Briefly, a composition comprising nickel-based precursor particles doped with 0.01 to 0.5 wt. % of sulfur having a particle size distribution from 10 μm to 100 μm was vaporized in an ICP torch (PN50, Tekna Plasma Systems, Inc.) at a power in the range of 60 to 80 kW under reducing plasma conditions (argon/hydrogen). A scanning electronic microscope (SEM) image was obtained from a sample of the resulting nickel-based particles doped with 0.01 to 0.5 wt. % of sulfur and is shown in FIG. 4. The physical properties of these particles are shown in Table 2:

TABLE 2

| Physical properties of nickel-based particles doped with sulfur | Nickel-based particles doped with sulfur |
|---|---|
| BET | 7.48 $m^2/g$ |
| Oxygen content | 0.981% |
| D10 | 0.125 μm |
| D50 | 0.157 μm |

Example 3

Figure 5A:
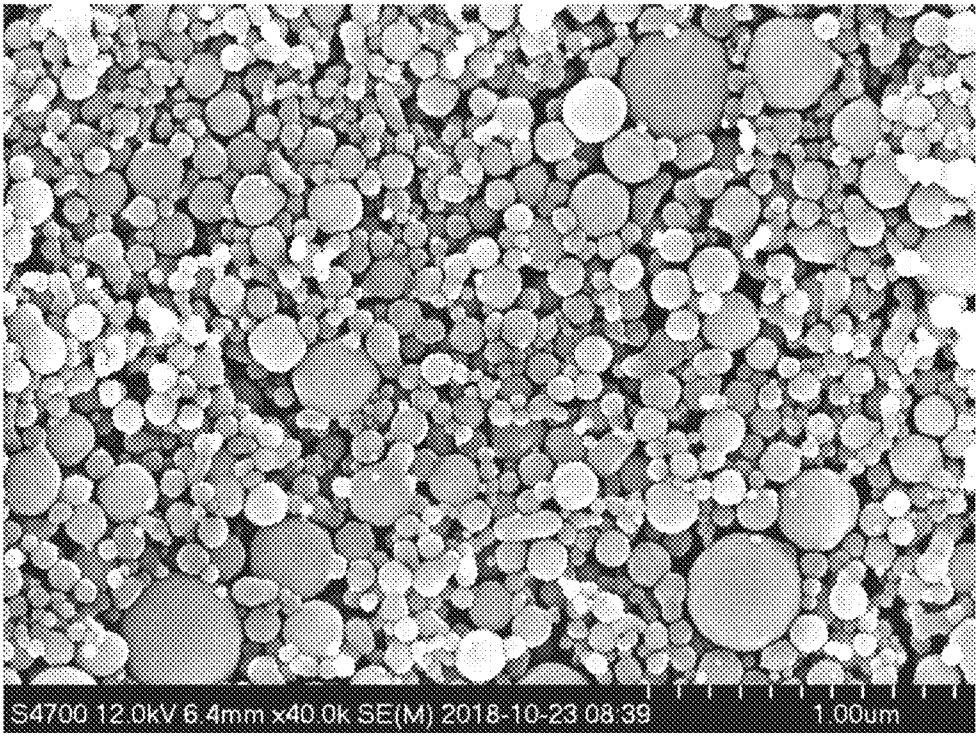
FIGS. 5A, 5B and 5C are scanning electronic microscope (SEM) images of a composition comprising nickel-based particles obtained with the process of FIG. 1, before classification.
Figure 5B:
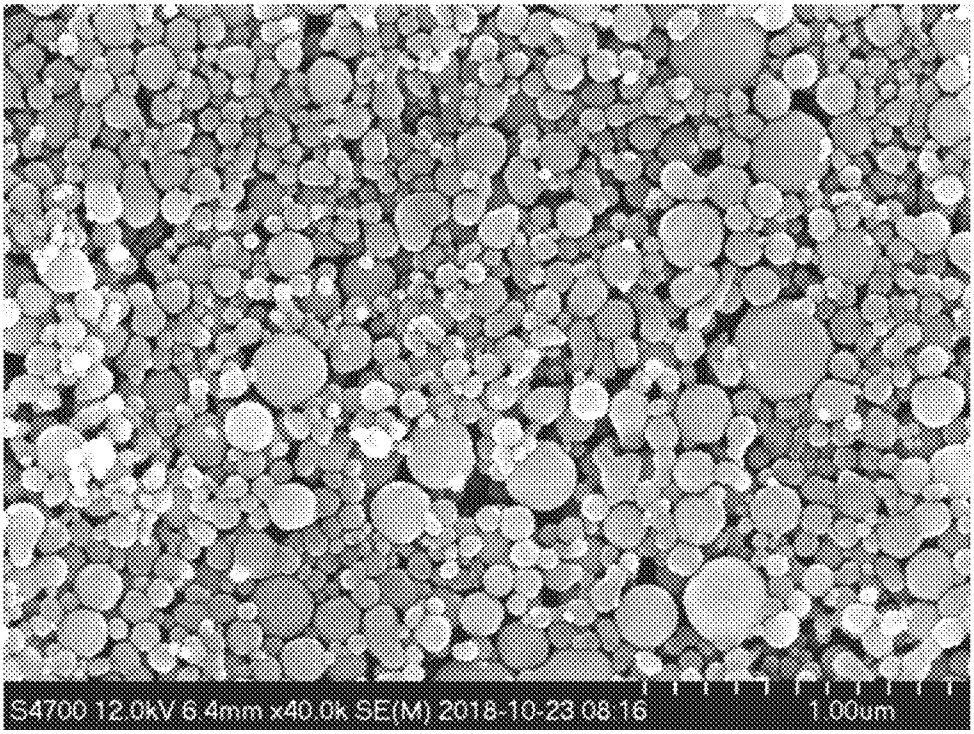
Figure 5C:
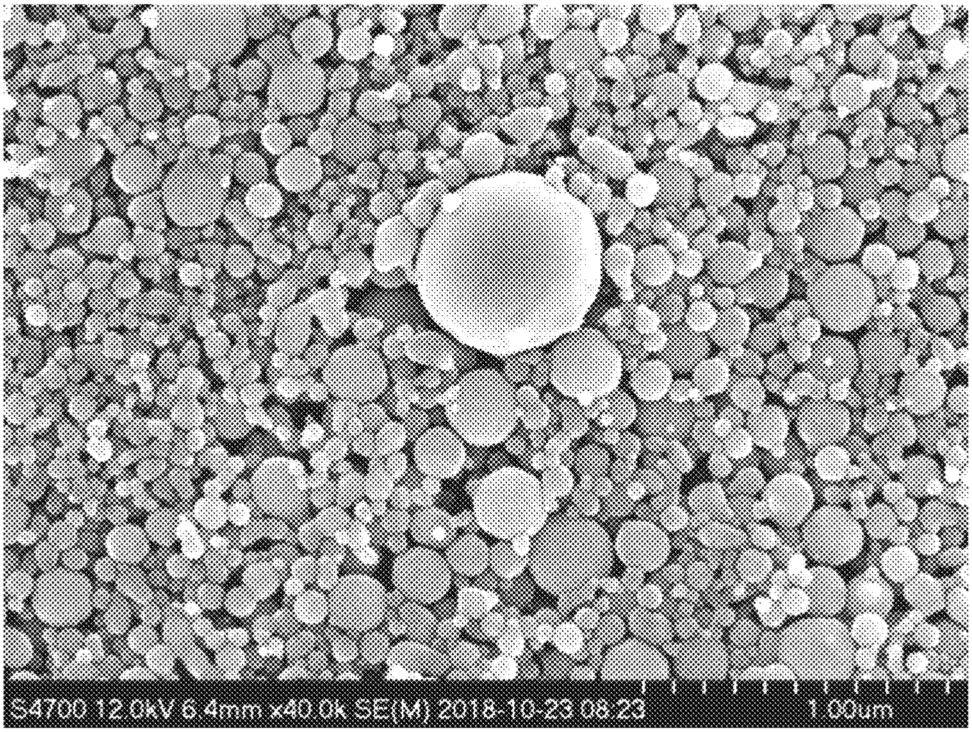

In this example, the process of Example 2 was repeated with argon carrier gas flow rate of 7.5 L/min and additive gas (oxygen) flow rate of 1.0 L/min and quench gas at 8000 L/min. SEM images are shown in FIGS. 5A-5C. The particle size distribution (PSD) of the composition before classification is reproduced in Table 3 whereas the PSD of the composition post-classification to obtain a D50 of 80 nm is reproduced in Table 4:

TABLE 3

| | |
|---|---|
| D50 (nm) | 88 |
| D90 (nm) | 195 |
| D99 (nm) | 329 |
| BET ($m^2/g$) | 7.77 |
| Particle shape | Spherical |
| Carbon content (wt. %) | 0.019 |
| Oxygen content (wt. %) | 1.1 |

TABLE 4

| Statistics | | |
|---|---|---|
| Minimum: | 15 | nm |
| Maximum: | 301 | nm |
| Mean: | 88.3 | nm |
| Std Dev.: | 43.5 | nm |
| Sum: | 157728 | nm |
| Count: | 1786 | |
| Under: | 0 | |
| Over: | 0 | |
| Accepted: | 100.0 | % |
| Field Count: | 4 | |
| Field Area: | 7584892 | $nm^2$ |
| Total Area: | 30,339570 + 06 | $nm^2$ |
| D10: | 42 | nm |
| D50: | 79 | nm |
| D90: | 146 | nm |
| D01 | 23 | nm |
| D99 | 227 | nm |

Example 4

In this example, the process of Example 2 was repeated with argon carrier gas flow rate of 7.5 L/min and additive gas (oxygen) flow rate of 0.6 L/min and quench gas at 8000 L/min. The particle size distribution (PSD) of the composition before classification is reproduced in Table 5:

TABLE 5

| | |
|---|---|
| D50 (nm) | 95 |
| D90 (nm) | 169 |
| D99 (nm) | 300 |
| BET ($m^2/g$) | 5.71 |
| Particle shape | Spherical |
| Carbon content (wt. %) | 0.050 |
| Oxygen content (wt. %) | 0.687 |

Example 5

In this example, the process of Example 2 was repeated with argon carrier gas flow rate of 5 L/min and additive gas (oxygen) flow rate of 1.0 L/min and quench gas at 1200 L/min. The particle size distribution (PSD) of the composition before classification is reproduced in Table 6:

TABLE 6

| | |
|---|---|
| D50 (nm) | 72 |
| D90 (nm) | 132 |
| D99 (nm) | 213 |
| BET ($m^2/g$) | 9.09 |
| Particle shape | Spherical |
| Carbon content (wt. %) | 0.028 |
| Oxygen content (wt. %) | 3 |

Example 6

In this example, the process of Example 2 was repeated with argon carrier gas flow rate of 5 L/min and additive gas (oxygen) flow rate of 1.0 L/min and quench gas at 1200 L/min. The particle size distribution (PSD) of the composition before classification is reproduced in Table 6:

TABLE 6

| | |
|---|---|
| D50 (nm) | 79 |
| D90 (nm) | 146 |
| D99 (nm) | 217 |
| BET ($m^2/g$) | 8.87 |
| Particle shape | Spherical |
| Carbon content (wt. %) | 0 |
| Oxygen content (wt. %) | 2.6 |

Example 7

In this example, the process of Example 2 was repeated with argon carrier gas flow rate of 5 L/min and additive gas (oxygen) flow rate of 1.0 L/min and quench gas at 1200 L/min. The particle size distribution (PSD) of the composition before classification is reproduced in Table 7:

TABLE 7

| | |
|---|---|
| D50 (nm) | 72 |
| D90 (nm) | 131 |
| D99 (nm) | 201 |
| BET ($m^2/g$) | 10.04 |
| Particle shape | Spherical |
| Carbon content (wt. %) | 0 |
| Oxygen content (wt. %) | 3.1 |

Comparative Example 1

In this example, a commercially available product produced by DC-plasma and commercialized as a composition comprising 80 nm nickel-based particles doped with sulfur was analyzed to determine the molecular contents as well as particle size distribution features (FEG SEM, 7 images were analyzed by gridded image analysis, with a total of 2775 particles analyzed). The results are reported in Tables 5-6:

TABLE 5

| Element | Ni (metal basis) | C | O | S |
|---|---|---|---|---|
| Method | ICP-MS | LECO | LECO | LECO |
| Result (wt. %) | 99.8 | 0.15 | 3.10 | 0.15 |

TABLE 6

| | |
|---|---|
| Mean (nm) | 104 |
| Std Deviation (nm) | 50.8 |
| Dmin (nm) | 13 |
| D1 (nm) | 18 |
| D10 (nm) | 43 |
| D50 (nm) | 96 |
| D90 (nm) | 175 |
| D99 (nm) | 242 |
| Dmax (nm) | 298 |
| <20 nm (%) | 1.66 |
| >350 nm (%) | 0 |

Example 8

Figure 15:
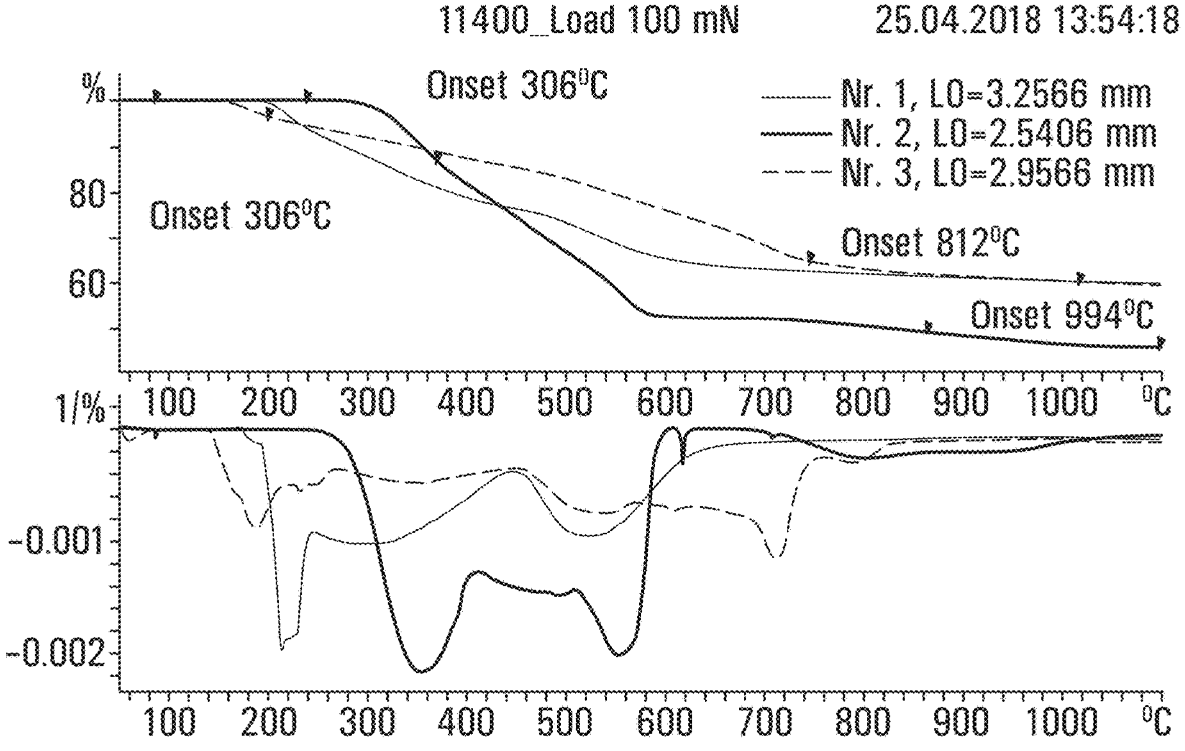
FIG. 15 is a graph illustrating the sintering behavior of nickel-based particles doped with sulfur compared to nickel-based particles without a doping agent, in accordance with an embodiment of the present disclosure.
Figure 16A:
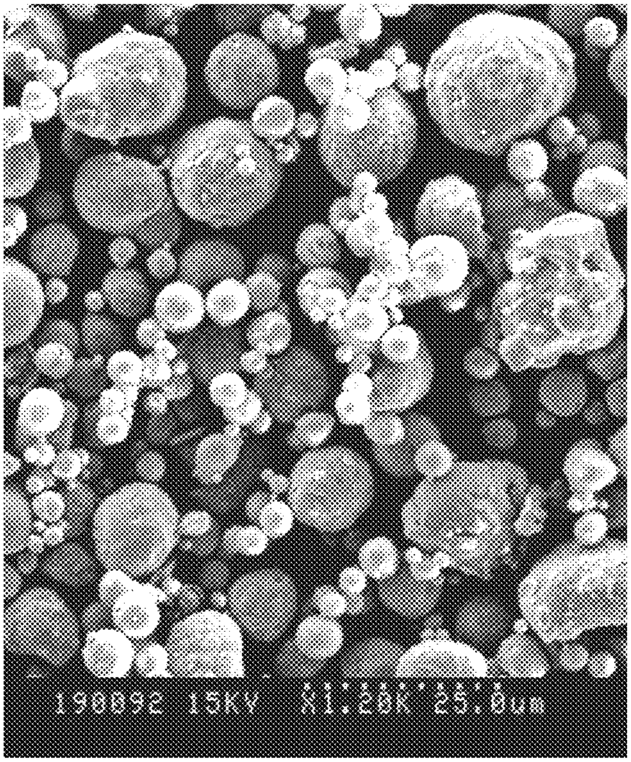
FIG. 16A is a scanning electronic microscope (SEM) image of a composition comprising nickel-based precursor particles doped with sulfur classified to retain fine sizes in accordance with an embodiment of the present disclosure.
Figure 16B:
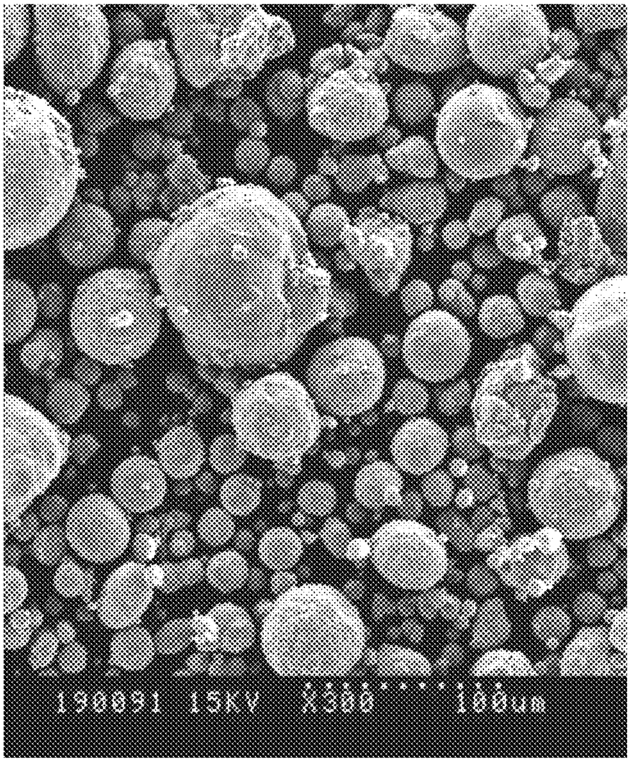
FIG. 16B is a scanning electronic microscope (SEM) image of a composition comprising nickel-based precursor particles doped with sulfur classified to retain coarse sizes in accordance with an embodiment of the present disclosure.
Figure 17:
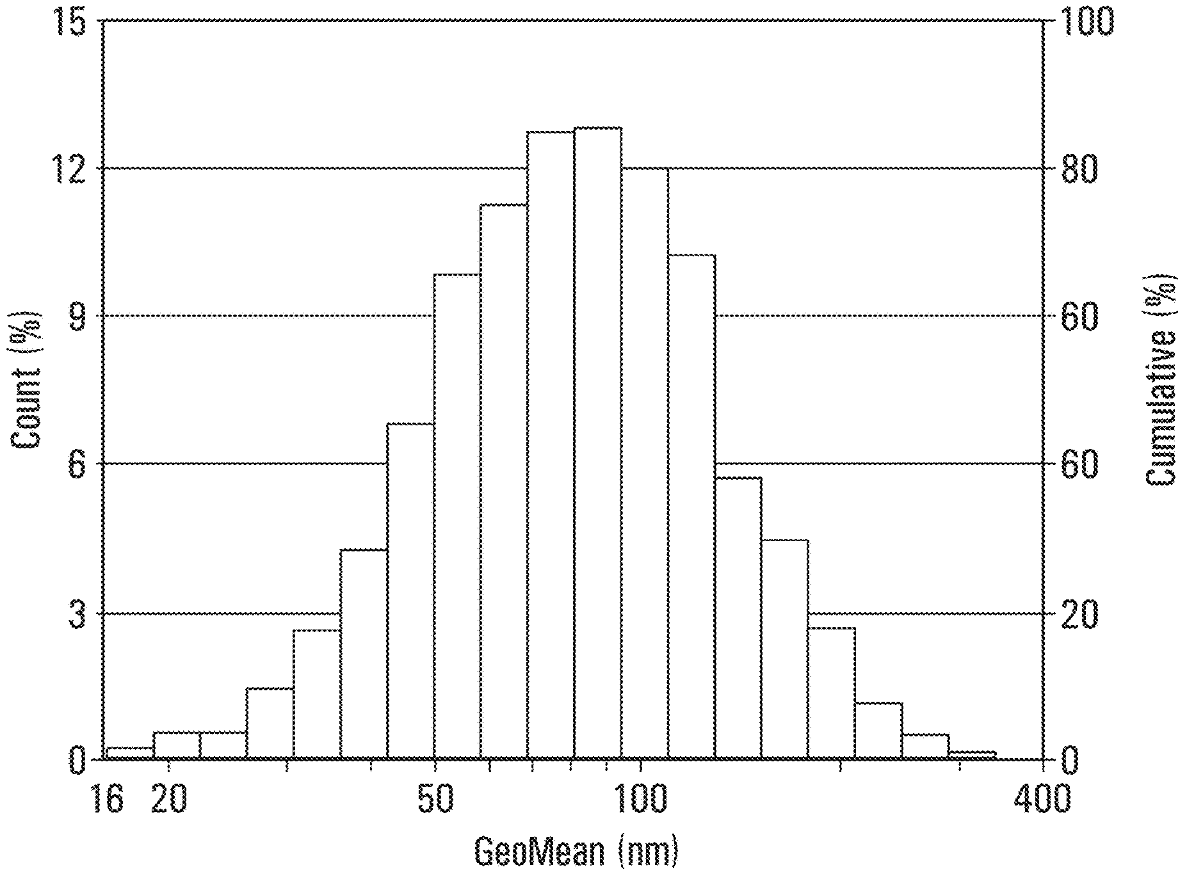
FIG. 17 is a graph illustrating particle size distribution of nickel-based particles doped with sulfur and classified to obtain a D50 of 80 nm, in accordance with an embodiment of the present disclosure.

In this example, the sintering behavior of nickel-based particles doped with sulfur obtained in Example 3 (sample 2) was compared to the sintering behavior of nickel-based particles without doping agent (samples 1 and 3). The results are produced in Table 7 as well as in FIG. 15.

TABLE 7

| Number | Tstart ° C. | Tend ° C. | Number of steps | $CTE_{100° C.}^{300° C.}$ ppm/K |
|---|---|---|---|---|
| 1 | 234 | 621 | 3 | 15.5 |
| 2 | 306 | 994 | 3 . . . 5 | |
| 3 | 153 | 812 | 5 | 13.1 |

These results show that in the composition, the sulfur is effectively incorporated into the nickel-based particles, rather than having a composition with separate sulfur particles and separate nickel particles, since the sintering behavior is changed with the presence of sulfur doping agent.

It should be appreciated that the disclosure is not limited to the particular embodiments described and illustrated herein but includes all modifications and variations falling within the scope of the subject matters as defined in the appended claims.

All references cited in this specification, and their references, are incorporated by reference herein in their entirety where appropriate for teachings of additional or alternative details, features, and/or technical background.

While the disclosure has been particularly shown and described with reference to particular embodiments, it will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the embodiments described herein.

Other examples of implementations will become apparent to the reader in view of the teachings of the present description and as such, will not be further described here.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the disclosure have been described and illustrated, it will be apparent to those skilled in the art in light of the present description that numerous modifications and variations can be made. The scope of the invention is defined more particularly in the appended claims.

The invention claimed is:

1. A composition in particulate form for use in an electrode layer of a multilayer ceramic capacitor (MLCC), the composition comprising:

metal-based particles having a D50 of <120 nm, wherein metal-based particles having a size >350 nm represent less than 1 ppm and the metal-based particles further comprise an oxidation layer on at least a portion of a surface of the metal-based particles, the oxidation layer comprising an oxide of the metal of the metal-based particles, the oxidation layer having a thickness of less than 15 nm.

2. The composition of claim 1, wherein the metal-based particles have a D99≤250 nm.

3. The composition of claim 1, wherein the metal-based particles have a D90≤200 nm.

4. The composition of claim 1, wherein the metal-based particles further comprise 0.1 wt. % or more of oxygen content.

5. The composition of claim 4, wherein the metal-based particles comprise 5 wt. % or less of oxygen content.

6. The composition of claim 1, wherein the thickness of the oxidation layer is less than about 10 nm.

7. The composition of claim 1, wherein the metal in the metal-based particles is nickel.

8. The composition of claim 1, wherein the metal in the metal-based particles is silver, copper, lead, palladium, platinum, gold, cobalt, iron, cadmium, zirconium, molybdenum, rhodium, ruthenium, tantalum, titanium, tungsten, or niobium.

9. The composition of claim 1, wherein the metal-based particles are doped with sulfur.

10. The composition of claim 9, wherein the sulfur has a concentration of from about 0.01 to about 0.5 wt. %.

11. A composition in particulate form for use in an electrode layer of a multilayer ceramic capacitor (MLCC), the composition comprising:

metal-based particles having a D50 of <120 nm and a Dmax<350 nm, wherein the metal-based particles further comprise an oxidation layer on at least a portion of a surface of the metal-based particles, the oxidation layer comprising an oxide of the metal of the metal-based particles, the oxidation layer having a thickness of less than 15 nm.

12. The composition of claim 11, wherein the Dmax <200 nm.

13. The composition of claim 11, wherein the metal-based particles have a D90≤200 nm.

14. The composition of claim 11, wherein the metal-based particles have a D99≤250 nm.

15. The composition of claim 11, wherein the metal-based particles further comprise 0.1 wt. % or more of oxygen content.

16. The composition of claim 15, wherein the metal-based particles comprise 5 wt. % or less of oxygen content.

17. The composition of claim 11, wherein the thickness of the oxidation layer is less than 10 nm.

18. The composition of claim 11, wherein the metal in the metal-based particles is nickel.

19. The composition of claim 11, wherein the metal in the metal-based particles is silver, copper, lead, palladium, platinum, gold, cobalt, iron, cadmium, zirconium, molybdenum, rhodium, ruthenium, tantalum, titanium, tungsten, or niobium.

* * * * *